(12) United States Patent
Gisquet et al.

(10) Patent No.: US 7,936,938 B2
(45) Date of Patent: May 3, 2011

(54) METHODS AND DEVICES FOR ENCODING A DIGITAL IMAGE SIGNAL AND ASSOCIATED DECODING METHODS AND DEVICES

(75) Inventors: Christophe Gisquet, Rennes (FR); Félix Henry, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1607 days.

(21) Appl. No.: 11/219,733

(22) Filed: Sep. 7, 2005

(65) Prior Publication Data
US 2006/0050789 A1 Mar. 9, 2006

(30) Foreign Application Priority Data

Sep. 7, 2004 (FR) ...................................... 04 09482
Feb. 28, 2005 (FR) ...................................... 05 02033

(51) Int. Cl.
*G06K 9/46* (2006.01)

(52) U.S. Cl. ................... 382/246; 382/273; 375/240.23; 710/57

(58) Field of Classification Search .................. 382/245, 382/246, 273; 375/240.23, 253; 710/56, 710/57; 714/779; 358/426.13; 712/204, 712/210; 708/513, 518
See application file for complete search history.

(56) References Cited

U.S. PATENT DOCUMENTS

| 4,630,121 | A | * | 12/1986 | Suzuki et al. | 348/245 |
|---|---|---|---|---|---|
| 5,321,725 | A | * | 6/1994 | Paik et al. | 375/265 |
| 5,408,234 | A | | 4/1995 | Chu | 341/106 |
| 5,576,840 | A | * | 11/1996 | Fukushima | 386/46 |
| 5,717,394 | A | | 2/1998 | Schwartz et al. | 341/51 |
| 6,343,157 | B1 | * | 1/2002 | Yada | 382/246 |
| 6,741,651 | B1 | | 5/2004 | Watabe et al. | 375/240.23 |
| 6,865,299 | B1 | * | 3/2005 | Nakayama | 382/246 |
| 7,277,585 | B2 | * | 10/2007 | Yagishita et al. | 382/232 |
| 7,346,106 | B1 | * | 3/2008 | Jiang et al. | 375/240.12 |
| 7,348,901 | B2 | * | 3/2008 | De Martin et al. | 341/67 |
| 7,414,650 | B2 | * | 8/2008 | Gonzalez | 348/231.1 |
| 7,657,108 | B2 | * | 2/2010 | Fuchs et al. | 382/239 |
| 2002/0085634 | A1 | | 7/2002 | Morel | 375/240.3 |

(Continued)

FOREIGN PATENT DOCUMENTS

EP          0 680 221 A2    11/1995

(Continued)

OTHER PUBLICATIONS

Yang et al., Dynamic Thresholds for Shared Buffer Switches with Variable Length Packets, 2002, The Institute of Electronics, Information and Communications Engineers, pp. 147-150.*

(Continued)

*Primary Examiner* — Matthew C Bella
*Assistant Examiner* — Dennis Rosario
(74) *Attorney, Agent, or Firm* — Fitzpatrick, Cella, Harper & Scinto

(57) ABSTRACT

A method of encoding a digital image signal comprising a plurality of samples. The method comprises the following steps, applied during the encoding of each sample with a view to its storage in a buffer. The level of occupancy of the buffer is determined, and the level of occupancy is compared with a predetermined threshold. An encoding mode is determined from among a plurality of encoding modes when the level of occupancy is above the predetermined threshold, and encoding the sample according to the determined encoding mode, and the sample is encoded according to a default encoding mode when the level of occupancy is below the predetermined threshold.

17 Claims, 16 Drawing Sheets

U.S. PATENT DOCUMENTS

| | | | | |
|---|---|---|---|---|
| 2002/0181585 | A1* | 12/2002 | Harada | 375/240.03 |
| 2004/0096113 | A1* | 5/2004 | Taima | 382/239 |
| 2006/0088221 | A1 | 4/2006 | Henry et al. | 382/232 |

FOREIGN PATENT DOCUMENTS

| | | | |
|---|---|---|---|
| EP | 1 091 588 A | | 4/2001 |
| EP | 1 237 378 A2 | | 9/2002 |
| EP | 1 351 518 A2 | | 10/2003 |
| FR | 2 691 272 A1 | | 11/1993 |
| FR | 2 691 272 A | | 11/2003 |

OTHER PUBLICATIONS

Reininger, D., et al. "Rate Control for VBR MPEG Video on Local Area Networks", Proceedings of the SPIE, SPIE, Bellingham, VA, US, vol. 2188, No. 8, pp. 153-162, Feb. 8, 1994.

S. Lam et al., "An Algorithm for Lossless Smoothing of MPEG Video", Applications, Technologies, Architectures, and Protocols for Computer Communication Proceedings from the Conference entitled "Communications, Architectures, Protocols, and Applications", London, UK, pp. 281-293, 1994.

M. Weinberger et al., "The LOCO-I Lossless Image Compression Algorithm: Principles and Standardization into JPEG-LS", IEEE transactions on Image Processing, vol. 9, No. 8 pp. 1309-1324, Aug. 2000.

M. Weinberger et al., "The LOCO-I Lossless Image Compression Algorithm: Principles and Standardization into JPEG-LS", Hewlett-Packard Laboratories Technical Report No. HPL-98-193R1, pp. 1-31, Oct. 1999.

Jae-Beom Lee et al., "Optimal Shape Coding Under Buffer Constraints", IEEE Comput. Soc, US, vol. 1, Oct. 4, 1998, pp. 290-294.

N. Zhang et al., "Improving Bits Allocation and Quantization Level Control for MPEG2 Encoders", Industrial Electronics, Control, and Instrumentation, 1996. Proceedings of the 1996 IEEE IECON $22^{nd}$ International Conference on Taipei, Taiwan, Aug. 5-10, 1996, New York, NY, USA IEEE, US, vol. 1, Aug. 5, 1996, pp. 560-565.

* cited by examiner

| $R_i$ | $G_i$ | ... | $R_j$ | $G_j$ |
|---|---|---|---|---|
| $G_i$ | $B_i$ | ... | $G_j$ | $B_j$ |
| $R_{i+1}$ | $G_{i+1}$ | ... | $R_{j+1}$ | $G_{j+1}$ |
| $G_{i+1}$ | $B_{i+1}$ | ... | $G_{j+1}$ | $B_{j+1}$ |
| $R_{i+2}$ | $G_{i+2}$ | ... | $R_{j+2}$ | $G_{j+2}$ |

Figure 2

| Index | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|
| Occupation of buffer memory | 10 | 30 | 55 | 60 | 60 | 58 | 62 | 67 | 58 | 58 | 53 | 66 | 60 | 61 | 62 | 64 | 69 | 69 | 69 |
| PANIC | 0 | 0 | 0 | 1 | 1 | 1 | 1 | 1 | 1 | 1 | 0 | 1 | 1 | 1 | 1 | 1 | 1 | 1 | 1 |
| MODE | - | - | - | 0 | 0 | 0 | 0 | 0 | 0 | 0 | - | 0 | 0 | 0 | 0 | 0 | 0 | 1 | 1 |
| COST | X | X | X | 0 | 0 | -2 | +2 | +7 | -2 | -2 | X | 0 | -6 | -5 | -4 | -2 | +3 | -4 | -5 |

Figure 5

METHODS AND DEVICES FOR ENCODING A DIGITAL IMAGE SIGNAL AND ASSOCIATED DECODING METHODS AND DEVICES

FIELD OF THE INVENTION

The present invention concerns a method and device for encoding an image as well as a method and device for decoding an encoded image.

The present invention concerns in general terms the encoding and decoding of multimedia entities that is to say digital text, voice and/or image signals, without loss of digital signals and avoiding overflow of the buffer memory.

A particularly advantageous, but not exclusive, preferred application of the present invention is the encoding/decoding of digital images without loss and using a buffer memory of reduced size, for example in the field of medical imaging or digital cameras.

BACKGROUND OF THE INVENTION

A digital image coming for example from a digital photographic apparatus consists of a set of N×M pixels, where N is the height of the image in pixels and M the width of the image. The image thus obtained is encoded before being stored in memory. The initial data, that is to say the information representing the pixels of the image, are organized in a bidirectional table accessible, for example, line by line.

It is known that the operations of encoding and decoding digital images require a relatively high memory capacity as well as a long processing time.

Moreover, the size of the data output by these operations may be relatively high, which has a direct impact on the capacity of the buffer or buffers necessary for storing these data.

This is because the role of the buffers is to store the data of variable length output by the encoding device with a view to their transportation over the communication bus, said bus having a fixed and limited transport capacity per clock cycle.

However, the cost of buffers is generally higher, the greater the storage capacity.

Moreover, It is known that, when a signal encoding technique (for example, the encoding of images) is implemented in practice, the problem of the difference in the rate of input of the data of the signal in the encoding device and the rate of output from the encoding device must be managed.

This is because, during the encoding of the signal, the input rate is constant whereas the rate of output from the encoding device is variable and, in general, is less than the input rate.

The variable output rate of the encoding device may cause the generation of a quantity of data that is too great with respect to the capabilities of processing of the system which follows the encoding device.

To avoid having too much encoded data to transport and to process by the processing device, a buffer memory of FIFO ("First In First Out") type is commonly used at the output of the encoding device.

More particularly, the buffer memory has the role of storing the data of variable length coming from the encoding device for the purpose of transporting them to the processing device through a communication bus, the latter having a fixed and limited capacity of transport, per clock cycle.

Moreover, the size of the data coming from the encoding device may be relatively high, which has a direct impact on the capacity of the buffer memory necessary for the storage of those data.

However, the cost of the buffer memories is generally all the higher that the storage capacity is great.

Thus, it is recommended to have a buffer memory of as small a size as possible.

However, the smaller the size of the buffer memory, the greater the risk during the encoding of images of the buffer memory being full, which then causes the process to stop.

Given the above, it is therefore necessary to install a buffer memory of which the size is sufficient such that the chances of it being full during the lifetime of the apparatus integrating the encoding device are virtually zero. For example, if it is an encoding device installed in a digital apparatus, it must be ensured that the size of the buffer memory is such that the problem is never encountered during the term of use of that apparatus.

For this reason, it is known to use a buffer memory of relatively large size and of which a large part is never used.

For all of these reasons, many studies have been carried out over several years for the purpose of minimizing the impact of the encoding and decoding on the size of the data output by these operations and on the size of the encoded data and thus on the filling of the buffer memories.

Thus there is known for example, from the U.S. Pat. No. 6,741,651, a method of encoding an image in a video stream which consists of comparing the size of the encoded image with a predetermined threshold. If the threshold is exceeded, then the method makes provision for replacing this image with a code representing an image index.

However, this method has the drawback of effecting an encoding with loss, which is not always acceptable.

In addition, from U.S. Pat. No. 5,717,394, a method is known for producing data of length close to a predetermined value, so reducing the variation in the rate of output from the encoding device. To do this, a plurality of encoded items of data of variable lengths are combined for the purpose of creating data of predetermined lengths.

However, such data must nevertheless be held in memory in order to be combined, so necessitating memories of relatively large sizes.

Furthermore, the document entitled "An Algorithm for Lossless Smoothing of MPEG Video" by Simon S. Lam, Simon Chow, and David K. Y. Yau Applications, Technologies, Architectures, and Protocols for Computer Communication Proceedings from the conference entitled "Communications architectures, protocols and applications", London, United Kingdom—Pages: 281-293, 1994, describes a method exploiting the specific model of variation of the MPEG data stream in order to define a rate avoiding an increase in use of the buffer memory. This method relies on knowing in advance the time at which the occupancy of the memory starts to increase.

However, these methods have the drawback not only of using buffer memories of which the size is relatively great without however ensuring avoidance of the size of the buffer memory being exceeded, but also, of having low flexibility with respect to a strong unexpected increase in the use of the buffer memory.

Furthermore, according to these methods, the large majority of the capacity of the buffer memory is never used.

It would consequently be advantageous to be able to regulate the level of occupancy of a buffer serving for storing encoded data, in particular whilst performing an encoding without loss.

SUMMARY OF THE INVENTION

The present invention aims firstly to provide a method of encoding a digital image signal comprising a plurality of samples. The method comprises the following steps, applied during the encoding of each sample with a view to its storage in a buffer:

determining the level of occupancy of the buffer, comparing the level of occupancy with a predetermined threshold, determining an encoding mode from amongst a plurality of encoding modes when the level of occupancy is above the predetermined threshold, and encoding the sample according to the determined encoding mode, encoding said sample according to a default encoding mode when the level of occupancy is below the predetermined threshold.

Thus, first it is detected whether the buffer receiving the encoded data reaches a certain filling threshold. If the filling level exceeds this predetermined threshold, the invention makes provision for reducing the size of the encoded data input to the buffer. For this purpose, the mode of encoding the sample is adapted so as to reduce the size of the encoded data. The adaptation thus consists of the determination of an appropriate encoding mode.

However, when the level of occupancy of the buffer is below the predetermined threshold, the encoding of the sample is carried out according to a default encoding mode.

According to this method, the maximum level of occupancy of the buffer is reduced and the efficacy of the encoding is preserved.

Thus the size of the buffer can be reduced by more than half, therefore reducing the hardware implementation cost.

In addition, this solution is compatible with a continuous stream system, capable of processing the signal without interrupting the sending of data.

According to another characteristic, the determined encoding mode is used for encoding a predetermined number of samples following said sample to be encoded, and called following samples.

This is because, when the level of occupancy of the buffer is above the predetermined threshold, an encoding mode will be determined with a view to its application to a given number of samples, in order to attempt to reduce the level of occupancy of the buffer.

According to additional characteristic, the method further comprises a step of simulating the encoding of said sample according to at least one encoding mode different from the determined encoding mode when the level of occupancy is above the predetermined threshold.

In parallel with the encoding of the sample according to a determined encoding mode, the encoding of this sample according to at least one other encoding mode is simulated with a view to evaluating the encoding cost brought about by the determined encoding mode with respect to the cost brought about by at least one other encoding mode.

According to a particular characteristic, the method according to the invention comprises a step of evaluating an encoding cost associated with each encoding of said sample to be encoded according to the determined encoding mode and according to said at least one other simulated encoding mode.

The purpose of this evaluation is to determine the encoding mode which in principle generates the fewest bits from amongst the encoding and encoding simulation results obtained with the various encoding modes used.

According to one characteristic, the determination of an encoding mode of at least one following sample to be encoded is a function of the evaluated encoding costs associated with the encoding of at least one sample preceding said at least one following sample to be encoded.

Thus the encoding costs resulting on the one hand from the encoding of at least one sample preceding said at least one following sample to be encoded and on the other hand the simulation of the encodings of said at least one sample preceding said at least one following sample to be encoded are compared with a view to determining the encoding mode best adapted for reducing the level of occupancy of the buffer.

According to an additional characteristic, the determination of an encoding mode of at least one following sample to be encoded is a function of the evaluated encoding costs associated with the encoding of at least one sample preceding said at least one following sample to be encoded and comprises the selection of the encoding mode whose evaluated encoding cost, associated with the encoding of said predetermined number of samples preceding said at least one following sample to be encoded, is minimum.

According to this characteristic, the determination of the next encoding mode is carried out according to the change in the encoding costs, simulated or not, concerning the samples preceding the sample to be encoded.

According to a particular characteristic, the method further comprises a step of associating with said sample an item of information representing the encoding mode used for encoding said sample.

With a view to simplifying the decoding method associated with the encoding method, an item of information is associated with a sample to be encoded in order to indicate to the decoding method the encoding mode used.

According to a variant, the method further comprises a step of associating with said following samples an item of information representing the determined encoding mode for encoding said following samples.

With a view to simplifying the decoding method associated with the encoding method, an item of information is associated with a set of samples to be encoded in order to indicate to the decoding method the encoding mode used for this set of samples.

According to a particular embodiment, it further comprises the following steps:

comparing the level of occupancy with a second predetermined threshold, encoding the following samples using a predetermined fixed length encoding mode when the level of occupancy is above the second predetermined threshold.

Thus, it is detected if the buffer memory receiving the encoded data reaches a second certain threshold of occupancy If that level of occupancy exceeds the second predetermined threshold, the invention provides for making the input rate and the output rate of the encoding device equivalent. For this, the encoding of the following samples is carried out using a predetermined fixed length encoding mode. Thus the level of occupancy of the buffer memory remains constant.

According to a particular characteristic, the predetermined fixed length encoding mode corresponds to binary encoding.

According to a particular embodiment, the plurality of encoding modes comprises a Rice-Golomb encoding.

According to another particular embodiment, the plurality of encoding modes comprises a binary encoding.

According to a particular characteristic, the default encoding mode is a Rice-Golomb encoding.

Another aim of the present invention is to provide a method of encoding a digital image signal comprising a plurality of samples. The method comprises the following encoding steps applied to samples taken in a predetermined order for the purpose of their storage in a buffer memory:

encoding the samples using a predetermined variable length encoding mode so long as the level of occupancy of the buffer memory is less than a predetermined threshold, encoding the following samples using a predetermined fixed length encoding mode.

Thus, it is detected if the buffer memory receiving the encoded data reaches a certain threshold of occupancy.

So long as the level of occupancy is less than a predetermined threshold, the invention provides for the use of a predetermined variable length encoding mode making it possible on average to reduce the size of the encoded data.

If that level of occupancy exceeds the predetermined threshold, the invention provides for making the input rate and the output rate of the encoding device equivalent. For this, the encoding of the following samples is carried out using a predetermined fixed length encoding mode. Thus the level of occupancy of the buffer memory remains constant.

According to this method, the size of the buffer memory necessary is reduced, for example, by more than half, or even by a factor of 5 to 10, so reducing the cost of implementation in terms of hardware. Furthermore, this method enables any overflow of the buffer memory to be avoided.

Furthermore, this solution is compatible with a continuous stream system which is capable of processing the signal without interrupting the sending of data.

According to one feature, the predetermined threshold is less than or equal to the size of the buffer memory reduced by the maximum length of a code obtained using the predetermined variable length encoding mode.

According to a specific embodiment, the predetermined variable length encoding mode corresponds to Rice-Golomb encoding.

According to a specific embodiment, the predetermined fixed length encoding mode corresponds to binary encoding.

Another aim of the present invention is to provide a method of decoding an encoded digital image signal comprising a plurality of encoded samples. The method comprises the following steps applied during the decoding of each encoded sample, said sample having been stored in a buffer after encoding:

simulating the level of occupancy of the buffer at the end of the step of encoding the sample preceding the encoded sample to be decoded, comparing the simulated level of occupancy with a predetermined threshold, determining a decoding mode from amongst a plurality of decoding modes when the simulated level of occupancy is above the predetermined threshold, and decoding said encoded sample according to the determined encoding mode, decoding said encoded sample according to a default decoding mode when the simulated level of occupancy is below the predetermined threshold.

The decoding method according to the invention is based, firstly, on the simulation of the level of occupancy of the buffer when the sample preceding the encoded sample to be decoded has been encoded. If the simulated level of occupancy is above a predetermined threshold, then the method makes provision for determining a decoding mode and thus for decoding this encoded sample, this decoding mode corresponding to the encoding mode used for encoding this sample. In the contrary case, that is to say when the simulated level of occupancy is below the predetermined threshold, then the decoding of the encoded sample is performed according to the default decoding mode.

The mode of encoding of the sample being determined according to the level of occupancy of the buffer, the decoding of this encoded sample is therefore also a function of this level of occupancy. Thus, in order to determine the adapted encoding mode and therefore consequently the adapted decoding mode, it is necessary to simulate the level of occupancy of the buffer at the time of encoding.

According to one characteristic, the determined decoding mode is used for the decoding of a predetermined number of encoded samples following said encoded sample to be decoded.

When the simulated level of occupancy of the buffer is above the predetermined threshold, the decoding mode can be determined with a view to its application to a given number of encoded samples. This is because, during the encoding process, the encoding according to the determined encoding mode is carried out on a determined number of samples. The decoding method must therefore also perform the decoding according to the determined decoding mode on the predetermined number of samples.

According to one characteristic, subsequently to the step of decoding said encoded sample, when the simulated level of occupancy is above the predetermined threshold, the method comprises a further step of simulating the encoding of said sample according to at least one encoding mode chosen from amongst a plurality of encoding modes and different from the encoding mode used for encoding said sample.

Thus, following the decoding of the encoded sample according to a determined decoding mode, the encoding of this sample is simulated according to at least one other encoding mode different from the encoding mode used for encoding the sample during the encoding process. The purpose of this simulation is to determine the length of the code obtained by encoding according to at least one other encoding mode and therefore the associated encoding cost.

According to a particular characteristic, the method comprises a step of evaluating an encoding cost associated on the one hand with the encoding of said sample according to the encoding mode used for encoding said sample and on the other hand with the simulation of the encoding of said sample according to said at least one encoding mode chosen from amongst a plurality of encoding modes.

The purpose of this simulation is to determine the encoding mode used during the encoding of the following sample, and which in principle generates the fewest bits amongst the encoding and encoding simulation results obtained with the various encoding modes used. The decoding mode corresponding to the encoding mode thus determined is deduced.

According to one characteristic, the determination of a decoding mode of at least one encoded sample is a function of the evaluated encoding costs associated with the encoding of at least one sample preceding said at least one sample to be decoded.

Thus the encoding costs resulting from the simulation of the encodings of at least one sample preceding said at least one sample to be decoded are compared with a view to determining the encoding mode best adapted for reducing the level of occupancy of the buffer. The decoding mode to be used is deduced therefrom.

According to one characteristic, the determination of a mode of decoding at least one encoded sample is a function of the evaluated encoding costs associated with the encoding of at least one sample preceding said at least one encoded sample to be decoded and comprises the selection of the encoding mode whose evaluated encoding cost associated with the predetermined number of samples preceding said at least one encoded sample to be decoded is minimum.

According to this characteristic, the determination of the next decoding mode is performed according to the change in simulated encoding costs concerning the samples preceding the sample to be decoded.

According to another characteristic, the method further comprises a step of obtaining an item of information representing the encoding mode used for encoding said sample, with a view to determining the mode of decoding said encoded sample.

Obtaining the information representing the encoding mode used for encoding the sample to be decoded makes it possible to immediately perform the decoding of this sample, without requiring any additional cost for determining the encoding performed.

According to a variant, the method further comprises a step of obtaining an item of information representing the encoding mode used for encoding said predetermined number of samples, with a view to determining the mode of decoding said predetermined number of encoded samples.

Obtaining the information representing the encoding mode used for encoding a set of samples to be decoded makes it possible to immediately perform the decoding of this set of samples without requiring any additional cost for determining the encoding performed.

According to an embodiment, it further comprises the following steps:
  comparing the simulated level of occupancy with a second predetermined threshold,
  decoding the following samples using a predetermined fixed length decoding mode when the simulated level of occupancy is above the second predetermined threshold.

According to a particular embodiment, the predetermined fixed length decoding mode corresponds to binary encoding.

According to a particular embodiment, the plurality of decoding modes comprises a Rice-Golomb decoding.

According to another particular embodiment, the plurality of decoding modes comprises a binary decoding.

According to a particular characteristic, the default decoding mode is a Rice-Golomb decoding.

Still another aim of the present invention is to provide a method of decoding an encoded digital image signal comprising a plurality of encoded samples. The method comprises the following decoding steps applied to encoded samples that are arranged in an encoding order for the purpose of their storage in a buffer memory:
  decoding the encoded samples using a predetermined variable length decoding mode so long as the simulated level of occupancy of the buffer memory at the end of the step of encoding the sample preceding the current sample is less than a predetermined threshold,
  decoding the following encoded samples using a predetermined fixed length decoding mode.

The decoding method according to the invention relies on the simulation of the level of occupancy of the buffer memory when the sample preceding the current sample has been encoded.

So long as the simulated level of occupancy is less than a predetermined threshold, the method provides for using a predetermined variable length decoding mode for decoding that current sample, that decoding mode corresponding to the encoding mode used for encoding that sample.

If the simulated level occupancy exceeds the predetermined threshold, the decoding of the current sample is performed using the predetermined fixed length decoding mode.

As the encoding mode of the current sample is determined according to the level of occupancy of the buffer memory, the decoding of that encoded sample thus also depends on that level of occupancy. Thus, to determine the adapted encoding mode and consequently the adapted decoding mode, it is necessary to simulate the level of occupancy of the buffer memory at the time of encoding.

According to a specific embodiment, the predetermined variable length decoding mode corresponds to Rice-Golomb decoding.

According to another specific embodiment, the predetermined fixed length decoding mode corresponds to binary decoding.

Correspondingly, the invention also provides a device for encoding a digital image signal comprising a plurality of samples. The device comprises the following means applied to samples with a view to their storage in a buffer:
  means for determining the level of occupancy of the buffer,
  means for comparing the level of occupancy with a predetermined threshold,
  means for determining an encoding mode from amongst a plurality of encoding modes when the level of occupancy is above the predetermined threshold, and means for encoding the sample according to the determined encoding mode,
  means for encoding said sample according to a default encoding mode when the level of occupancy is below the predetermined threshold.

This device has the same advantages as the encoding method briefly described above.

The invention also provides a device for encoding a digital image signal comprising a plurality of samples. The device comprises the following encoding means applied to samples taken in a predetermined order for the purpose of their storage in a buffer memory:
  encoding means which are adapted to encode samples using a predetermined variable length encoding mode so long as the level of occupancy of the buffer memory is less than a predetermined threshold,
  encoding means which are adapted to encode the following samples using a predetermined fixed length encoding mode.

This device has the same advantages as the encoding method briefly described above.

Another aim of the present invention is also to provide a device for decoding an encoded digital image signal comprising a plurality of encoded samples. The device comprises the following means applied to encoded samples, said samples having been stored in a buffer after their encoding:
  means for simulating the level of occupancy of the buffer at the end of the encoding of the sample preceding the encoded sample to be decoded,
  means for comparing the simulated level of occupancy with a predetermined threshold,
  means for determining a decoding mode from amongst a plurality of decoding modes when the simulated level of occupancy is above the predetermined threshold, and means for decoding said encoded sample according to the determined decoding mode,
  means for decoding said encoded sample according to a default decoding mode when the simulated level of occupancy is below the predetermined threshold.

This device has the same advantages as the decoding method briefly described above.

A further aim of the present invention is also to provide a device for decoding an encoded digital image signal comprising a plurality of encoded samples. The device comprises the following decoding means applied to encoded samples that are arranged in an encoding order for the purpose of their storage in a buffer memory:

decoding means which are adapted to decode encoded samples using a predetermined variable length decoding mode so long as the simulated level of occupancy of the buffer memory after encoding the sample preceding the current sample is less than a predetermined threshold, decoding means which are adapted to decode the following encoded samples using a predetermined fixed length decoding mode.

This device has the same advantages as the decoding method briefly described above.

According to other aspects, the invention also concerns information processing devices able to function as encoding and decoding devices of the invention as briefly described above, a telecommunications system, as well as computer programs for implementing the methods of the invention briefly described above.

Other aspects and advantages of the present invention will emerge more clearly from a reading of the description of the embodiments which will follow, this description being given solely by way of non-limiting example and made with reference to the accompanying drawings.

BRIEF DESCRIPTION OF THE DRAWINGS

FIG. 2 shows a so-called Bayer grid according to which the initial data are organized;

FIG. 5 is an example of an illustration of the encoding algorithm according to the first aspect of the invention;

DETAILED DESCRIPTION

The encoding/decoding methods and devices according to the invention are now described in the context of their application to the processing of multimedia entities in the form of digital images.

Figure 1:
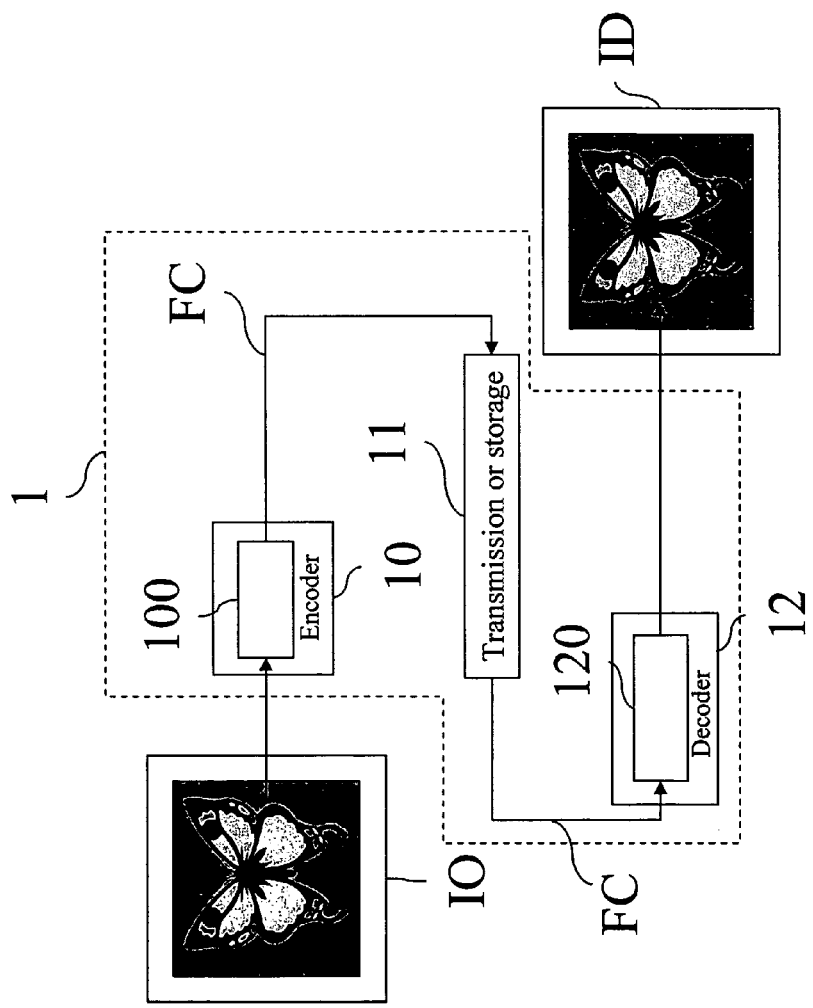
FIG. 1 shows in a simplified manner a process for processing digital images in which the encoding/decoding methods according to the invention are used.

With reference to FIG. 1 and designated by the general reference 1, a system for processing digital images incorporating encoding/decoding processing without loss according to the invention uses an encoder 10, a unit 11 and a decoder 12.

It should be noted here that the encoding/decoding methods according to the invention provide a particularly advantageous application in a telecommunications system comprising a plurality of terminal devices connected through a telecommunications network. The encoding/decoding methods according to the invention are then used in the terminal devices of the system so as to enable transmission of files through the telecommunications network and thus reduce the traffic and transmission times.

According to another particularly advantageous application, the encoding/decoding methods according to the invention are used in a device for storing multimedia entities so as to be able to store a large quantity of data in a storage unit.

As depicted in FIG. 1, the encoder 10 comprises an encoding device 100 according to the invention and receives as an input an original image IO. The image IO is processed by the encoder 10, which delivers an encoded file FC as an output.

The encoded file FC is supplied to the device 11 for example in order to be transmitted through a network or an adapted transmission means or in order to be stored in a storage unit.

The decoder 12 comprises a decoding device 120 according to the invention. The decoder 12 receives as an input the encoded file FC coming from the device 11 and supplies as an output a decoded image ID substantially identical to the original image IO.

Generally the initial data corresponding to the original image IO are organized in a bidimensional table which is accessible solely line by line.

In this embodiment, the initial data are, for example, represented in 10 bits and are organized according to a so-called Bayer grid, that is to say in alternation on a two-channel line. A channel comprises all the samples issuing from the digital image and corresponding to a color. The colors used are generally red (R), green (G) and blue (B).

An example of a Bayer grid is shown in FIG. 2.

The sequencing of the Bayer grid involves a regular alternation of lines of the type [RGRG . . . RG] and lines [GBGB . . . GB]. Other types of channel interleaving are however possible in variant embodiments of the invention.

Figure 3:
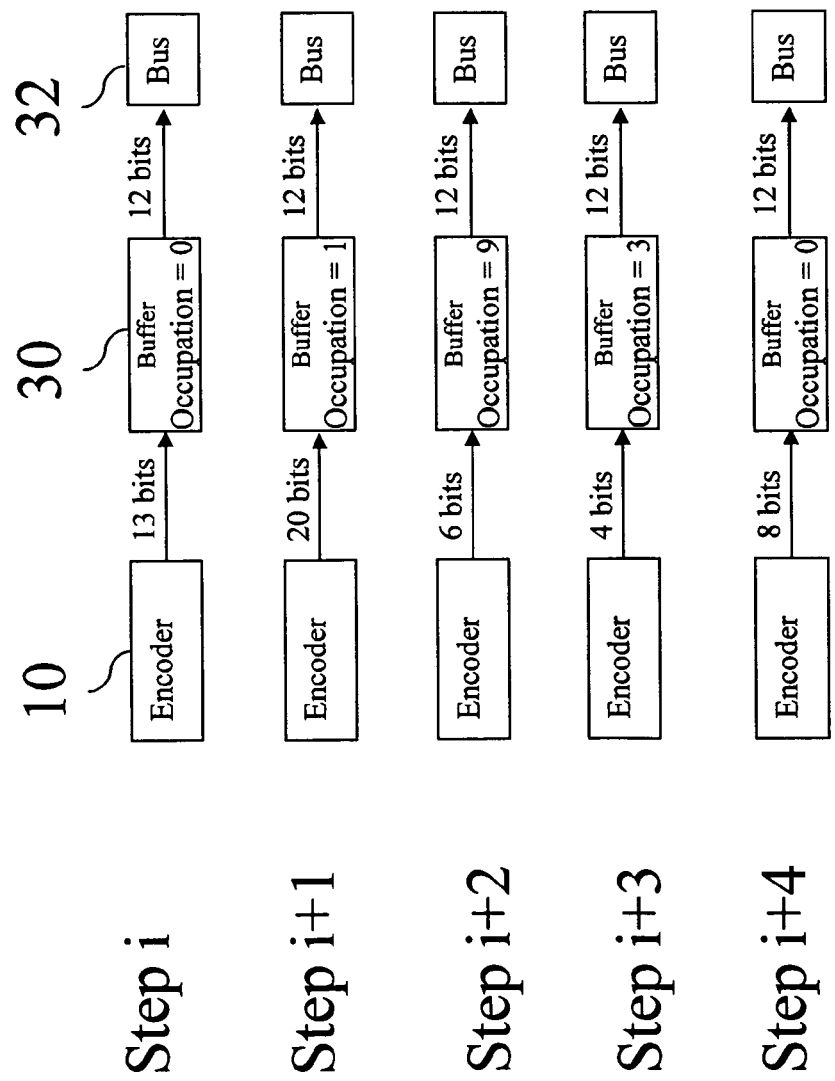
FIG. 3 depicts schematically an encoding apparatus according to the invention.

According to an operating scheme for encoding a digital image, the encoder 10 is connected to a communication bus 32 as illustrated in FIG. 3. The communication bus 32 makes it possible for the encoder 10 to communicate with various elements of the device with which the encoder is associated, elements which will be detailed with reference to FIG. 17.

Given the processing capacity of the communication bus 32 during one clock cycle, a buffer is inserted between the encoder and the communication bus.

This is because the communication bus 32 is capable, during one clock cycle, of transporting only a given number of bits issuing from the encoder 10. The buffer 30 inserted between the encoder 10 and the communication bus 32 thus temporarily stores the bits not able to be transported by the communication bus during one clock cycle. These bits will be transported by the communication bus during following clock cycles.

According to a given example, the communication bus 32 is able to process 12 bits. As depicted in FIG. 3 (step i), when the encoder 10 supplies 13 bits as an output, only 12 bits can be conveyed by the communication bus 32 during one clock cycle. In order not to lose the bit in addition to the first 12, it is stored in a buffer memory 30, as illustrated at step i+1 in FIG. 3 by the indication "Occupation=1".

Thus the presence of the buffer memory is necessary to adapt the stream of variable length data output by the encoder 10 to the processing capacity of the communication bus 32, said bus being able to read a fixed number of data at a fixed speed.

According to a variant embodiment, the encoder comprises the buffer memory 30.

As depicted in FIG. 3, during the following clock cycle, illustrated by example by step i+1, the encoder 10 supplies 20 bits as an output. During this clock cycle, the communication bus 32 will convey the bit already present within the buffer 30 and 11 bits output by the encoder 10. The bits beyond the first 11 bits, that is to say the following 9 bits, are stored in the buffer, as illustrated at step i+2 in FIG. 3. The occupancy level of the buffer is therefore 9 bits ("Occupancy=9").

During the following step i+3, the communication bus 32 conveys the 9 bits contained in the buffer memory 30 as well as the 3 bits produced by the encoder 10. The encoder having generated 6 bits, the bits beyond the first 3 bits are stored in the buffer memory, as illustrated in step i+3. The level of occupancy of the buffer memory is thus 3 bits ("Occupancy=3").

Next, during the following step i+4, the communication bus 32 will convey the 3 bits contained in the buffer memory 30 as well as the bits produced by the encoder 10. Thus, the device 10 having generated 8 bits, these latter are sent directly to the communication bus in addition to the 3 bits already present in the buffer memory. In this manner, all the bits generated by the encoder are sent, and the buffer memory is empty ("Occupancy=0") as illustrated in step i+4.

Thus the level of occupancy of the buffer is increased by the number of bits output by the encoder, from which the size of the communication bus is subtracted.

The circuits of the memory type, and in particular the complex ones such as buffers, are particularly expensive, as described below, and the invention makes it possible to reduce the size of these buffers.

According to a first aspect of the invention, digital image encoding methods and digital image decoding methods will now be described with reference to FIGS. 4 to 12.

Figure 4:
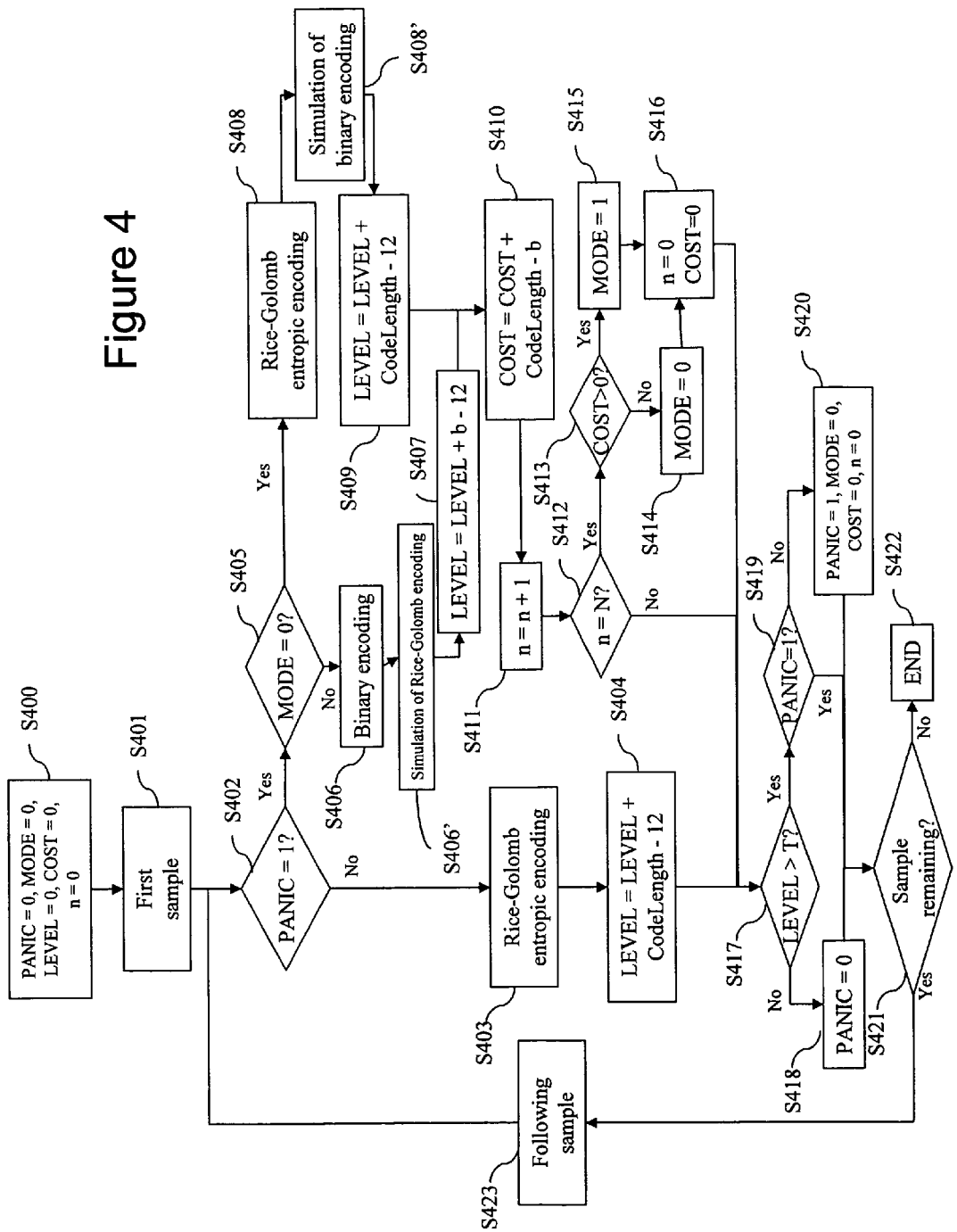
FIG. 4 is an algorithm of an embodiment of the encoding method according to a first aspect of the invention.

With reference to FIG. 4, a description is now given of a first digital image encoding method according to the invention used in the encoding device 100 of the encoder 10.

In this first embodiment, the digital image is divided into lines of one sample, in natural scanning order. Each line is then divided into a plurality of digital samples.

As shown in FIG. 4, the processing of the encoding process according to the invention commences with the use of a certain number of variables at step S400.

First of all, the variable PANIC, representing the state of occupancy of the buffer, is initialized to 0. This variable also reflects the status according to which the algorithm is executed. This is because when this variable has the value 0, the encoding method is in normal functioning. When this variable has the value 1, it reflects exceptional functioning of the encoding method, the purpose of this exceptional functioning being to attempt to reduce the level of occupancy of the buffer.

Thus the variable PANIC takes the value 0 when the level of occupancy of the buffer is low and takes the value 1 when the level of occupancy of the buffer becomes critical, that is to say when the buffer is used to a major extent.

For example, the variable PANIC takes the value 0 when the level of occupancy of the buffer is below a predetermined threshold, and the value 1 when the level of occupancy of the buffer is above the predetermined threshold.

Next the variable LEVEL, whose purpose is to measure the level of occupancy of the buffer, is initialized to 0.

The variable MODE identifies the encoding mode used when the variable PANIC has the value 1. This variable is initialized to 0. The variable MODE identifies a particular encoding mode from amongst a plurality of possible encoding modes.

For example, this variable takes the value 0 in order to identify the Rice-Golomb encoding and the value 1 to identify binary encoding.

Other encoding modes can also be used, such as Gray encoding, BCD encoding or arithmetic encoding.

A variable n is also initialized to 0. This variable counts the number of samples of the image which are encoded according to the same encoding mode, when the variable PANIC has the value 1.

Finally, the variable COST, corresponding to the relative cost of the encoding according to a first encoding mode compared with the encoding according to a second encoding mode for the same sample, is also initialized to 0.

For example, the variable COST indicates the relative cost of Rice-Golomb encoding compared with binary encoding for the same sample.

According to a variant, the encoding cost is associated with each encoding of the sample according to the encoding modes used or simulated. In particular if the choice is available between more than two encoding modes, it is preferable to associate a variable corresponding to each of these encoding modes in order then to be able to compare their costs easily.

Step S400 is followed by step S401, consisting of selecting the first sample of the digital image with a view to its encoding.

This step is followed by a first test of verifying the status according to which the algorithm is being executed (step S402).

If the variable PANIC has the value 0, then the algorithm is being executed according to normal functioning mode, and thus the encoding mode of the current sample is the default encoding mode.

By way of example, this default encoding mode is the Rice-Golomb entropic encoding carried out at step S403.

The current sample will thus be encoded according to the default encoding mode, that is to say a Rice-Golomb entropic encoding, described below.

If the current sample to be encoded is the first sample, then this is for example written in its binary form in the data stream. This is because, in this embodiment, the binary value of the first sample is not decorrelated by a linear prediction.

The binary form of the first sample is for example encoded in 12 bits.

According to a variant, the first sample can be encoded using Huffman encoding, with predefined codes. However, it should be noted that other forms of encoding can be employed in variant embodiments.

Concerning the following samples, they are processed according to the steps described below.

A first step consists of a step of decorrelating each channel by prediction.

For example, the decorrelation of the signal consists simply of a spatial decorrelation.

More particularly, the decorrelation is of the first order autoregressive model type. Thus, if the samples are called $X_1$, $X_2, \ldots, X_p$, then the decorrelated value $Y_i$ corresponding to the sample $X_i$ is:

$Y_i = X_i - X_{i-1}$, $i$ being the position of $Y_i$ and $X_i$ in the image.

Thus the decorrelated value $Y_i$ depends on the current sample $X_i$ and on the previous sample $X_{i-1}$.

According to the example defined above, the step of decorrelating each channel by prediction can lead to the following results:

$$R'_i = R_i - R_{i-1}$$

$$G'_i = G_i - G_{i-1}$$

$$B'_i = B_i - B_{i-1}$$

At the end of this spatial decorrelation operation, the decorrelated value $Y_i$ is for example encoded in 13 bits.

However, more complex predictive schemes can be envisaged.

This step is followed by a step consisting of an order prediction calculation for the Rice-Golomb codes.

As is known in the field of encoding, Rice-Golomb codes form a family of codes with a prefix, which are dependent on a positive integer parameter k, also referred to as the "order". Thus Rice-Golomb encoding of a decorrelated value $Y_i$ is a function of a parameter k. Rice-Golomb encoding is effective if the value of the parameter k is optimum for each sample to be encoded.

It is known that the optimum value of k is the number of significant bits of $Y_i$. However, the decorrelated value $Y_i$ is unknown since it must be decoded.

A conventional approach consists of estimating the value of the digital sample to be encoded from available values of previous samples of the digital signal to be encoded.

This explains why the first sample cannot be encoded in this way.

Thus, in order to best determine the decorrelated value $Y_i$, an estimation $Z_i$ of $Y_i$ to be encoded is performed. Methods of estimating the value $Z_i$ with respect to $Y_i$ are known from the state of the art.

Thus the order k to be used in Rice-Golomb encoding is determined by calculating the number of significant bits of $Z_i$ previously obtained.

Next, provision is made for calculating the Rice-Golomb code associated with the decorrelated value $Y_i$ and for putting it in memory.

It is known from the state of the art that, given the positive integer k referred to above, a Rice-Golomb code is a succession of bits composed of the following two parts:
- a prefix which is a unary code representing $U = \lfloor Y_i/2^k \rfloor$, with $\lfloor x \rfloor$ representing the truncation to the integer part of x. Thus the prefix is composed of U bits at 1 and one bit at 0, represented in the form $(1)^U 0$; and
- a suffix which is a binary representation of the value $(Y_i - 2^k U)$ encoded in k bits; it concerns the remainder of the integer division of $Y_i$ by $2^k$.

The Rice-Golomb code of the decorrelated value $Y_i$ is therefore calculated as indicated above from the previously determined parameter k. The Rice-Golomb code of $Y_i$ with the previously determined parameter k is entered in the data stream.

For example, the binary code of the value 134 over 12 bits being "000010000110", the encoding of that value according to the Rice-Golomb encoding mode of which the order is 7, generates a prefix of binary value "10" and a suffix of binary value "0000110".

This is because the calculation of the prefix is $134/2^{7=1}$ and the unary form of the value 1 is "10". The suffix takes the value of the remainder of the division of 134 by $2^7$, i.e. the value 6 which, written over 7 bits is "0000110".

Thus the Rice-Golomb code of the value 134 is "100000110".

Using this encoding, a code of which the size is 12 bits is changed to a code of which the size is 9 bits.

The length CodeLength of the code is determined in order then to be used during the following step S404. The function of this step is to update the level of occupancy of the buffer represented by the variable LEVEL. This variable is updated by increasing it by the value of CodeLength, from which the size of the communication bus 32 is subtracted.

The size of the communication bus being for example 12, the variable LEVEL is therefore updated by increasing it by the value of CodeLength minus the value 12.

Step S404 is followed by step S417, which will be described below.

Returning to step S402, when the result of the test is positive, that is to say when the value of the variable PANIC is at 1, signifying that the level of occupancy of the buffer has reached a critical occupancy threshold, the algorithm continues with the following step S405.

During step S405, the encoding mode which is to be used for encoding the current sample is tested.

For example, if the variable MODE has the value 0, then the current sample undergoes encoding according to Rice-Golomb encoding (step S408), otherwise the current sample undergoes encoding according to binary encoding (step S406).

Following on from step S406 or parallel with it, a simulation of encoding of this current sample is carried out according to a Rice-Golomb encoding (step S406'), making it possible to determine the length of the Rice-Golomb code.

The length of the Rice-Golomb code is used subsequently (step S410) in order to evaluate the cost relating to the two encoding modes envisaged.

This simulation is performed with a view to evaluating the cost of the binary encoding relative to the simulated cost of Rice-Golomb encoding, in order then to select, from amongst the two encoding modes considered, the appropriate encoding mode for reducing the level of occupancy of the buffer without however losing data. The purpose of this method is in fact to regulate the quantity of data produced by the encoding device and thus reduce the size of the buffer.

It should be noted that it is alternatively possible to simulate the encoding of the current sample according to two encoding modes, or even more.

The change in the relative cost will be studied in order to select the appropriate encoding mode. For this, the study of this change will be carried out on a given number of samples to be encoded, this set of samples being called a window.

According to one example implementation, the window comprises six samples. However, another size may be envisaged.

This concept of window is used only in the case where the variable PANIC has the value 1, that is to say when the level of occupancy of the buffer has exceeded a predetermined threshold. Thus the windows do not have a predetermined position in the signal of the digital image.

This step is followed by step S407 performing the calculation of the level of occupancy of the buffer.

According to one embodiment of the invention, the variable LEVEL is updated by increasing it by the value b minus 12, 12 being the size of the communication bus mentioned above and b the size of the binary code.

The binary value of the sample $X_i$ is written in b bits in the buffer, b being the number of significant bits of the sample. Thus the variable LEVEL is increased by b−12 in the example considered.

Step S407 is followed by step S410, which will be described below.

Returning to step S405, when the variable MODE takes the value 0, this step is followed by step S408, consisting of performing the encoding of the current sample according to a Rice-Golomb encoding.

The Rice-Golomb encoding is similar to the Rice-Golomb encoding performed at step S403, previously described.

As at step S406, following on from step S408 or in parallel to it, an encoding simulation of this current sample is performed according to a binary encoding for determining the length of the code (step S408'). Given that the binary encoding is of fixed length b, this simulation is made optional.

Step S408' is followed by step S409, consisting of determining the level of occupancy of the buffer at the end of the Rice-Golomb encoding of the current sample.

For this purpose, the variable LEVEL is increased by the length of the Rice-Golomb code minus the size of the communication bus, said bus transporting some of the data output by the encoding device.

Step S409 is followed by step S410, according to which the variable COST is updated by adding to it the length of the Rice-Golomb code, denoted CodeLength, minus the length b of the binary code.

The variable COST thus corresponds to the relative cost of a Rice-Golomb code compared with the binary code for encoding the same sample.

It should be noted that step S407 described above is also followed by step S410.

Step S410 is followed by step S411, consisting of incrementing by one unit the variable n representing the number of encoded samples of the current window (index of samples in the window).

Step S412, following on from step S411, tests whether all the N samples of the current window have been encoded.

If not all the samples of the window have been encoded, then the following step is the step S417 described below.

In the contrary case, it is considered that sufficient samples have been encoded and therefore the encoding mode can be re-evaluated.

To this end, step S412 is followed by step S413, during which the variable COST is tested and the encoding mode achieving a minimum encoding cost on the predetermined number of encoded samples is adopted.

This is because, if the variable COST is greater than 0, that is to the say the Rice-Golomb codes have produced more bits than the binary codes, then the samples of the following window will be encoded according to a binary encoding. These encodings will take place subject to the level of occupancy of the buffer not going once again below the predetermined threshold value.

Thus, at the following step S415, the variable MODE is positioned at the value 1.

In the contrary case, the samples of the following window will be encoded according to the Rice-Golomb encoding mode. The following step S414 therefore positions the variable MODE to the value 0, the latter representing the encoding mode of the next sample.

According to the variant in which the encoding cost is associated with each encoding of the sample according to the encoding modes used or simulated, step S413 consists of comparing the encoding costs associated on the one hand with the encoding of the current sample and on the other hand with the encoding according to the simulated encoding mode. From this comparison step, the encoding mode to be used for encoding the next sample to be encoded, which corresponds to the mode whose encoding cost is minimum, is derived therefrom.

Steps S414 and S415 are followed by step S416, consisting of reinitializing the variables n and COST to 0. Step S416 is followed by step S417, consisting of checking whether the level of occupancy of the buffer memory is above the predetermined threshold T.

If the check is negative, then, at the following step S418, the variable PANIC is set to 0, indicating thereby that the level of occupancy of the buffer memory is below the predetermined threshold. This step is then followed by step S421, which will be described below.

If on the other hand the verification is positive, then the status represented by the variable PANIC is tested during the following step S419.

If the variable PANIC reflects a normal operating mode, then step S419 is followed by the step S420 of initializing various variables.

This is because, at step S420, the variable PANIC is set to 1, in order to indicate that the level of occupancy of the buffer memory has exceeded the predetermined threshold.

Next the variables MODE, COST and n are set to 0.

This step is then followed by the step S421 mentioned above.

Likewise, when, at step S419, the variable PANIC has the value 1, already reflecting the fact that the level of occupancy of the buffer is above the predetermined threshold, then this step is followed by step S421.

Step S421 consists of testing whether samples remain to be encoded in the image.

In the negative, the algorithm is ended with step S422.

In the contrary case, at step S423, the following sample of the image is selected and becomes the new current sample.

According to the encoding method of the invention, the maximum level of occupancy of the buffer is reduced and the efficacy of the encoding is preserved.

This is because the use of this method has the advantage that the size of the buffer can be reduced by more than half. In addition, the hardware implementation is simple and the solution is compatible with a continuous-stream system.

With reference to FIG. 5, the first method of encoding digital images according to the invention is illustrated according to a given example.

The table in FIG. 5 contains on the first line the index i of the sample, on the second line the level of occupancy of the buffer in bits, on the third line the value of the variable PANIC, on the fourth line the value of the variable MODE when the variable PANIC has the value 1, on the fifth line the value of the variable COST, and finally on the sixth line the sample windows are shown.

In the example considered, the occupancy threshold of the buffer is fixed at T=56 bits.

When the samples of index 10, 11 and 12 are encoded, the level of occupancy of the buffer is below the threshold and the encoding of these samples is therefore carried out according to the default encoding mode. For example, the default encoding mode is a Rice-Golomb encoding.

However, when the sample of index 13 is encoded, it is perceived that the level of occupancy of the buffer is above the predetermined threshold. The variable PANIC is therefore set to the value 1 and the variable MODE is set to the value 0, the latter identifying the encoding mode of the current sample according to the Rice-Golomb encoding mode. This encoding mode will also be used for encoding the current window composed, according to the example, of six samples.

In parallel to the encoding of these samples according to the Rice-Golomb encoding, the method according to the invention makes provision for simulating the encoding of these samples according to at least a second encoding mode, the binary encoding. At each step of encoding a sample, the variable COST is updated in order to compare the two encoding modes. The sample encoded according to the encoding mode identified by the variable MODE is inserted in the stream of samples already encoded of the image.

The simulation of the second encoding, executed in parallel to or following on from the first encoding, is carried out for the purpose of determining the best adapted encoding mode for reducing the level of occupancy of the buffer.

At the end of the encoding of the samples of index 13 to 18, the variable COST being negative, it makes it possible to deduce that the encoding mode according to the Rice-Golomb encoding is more effective than the encoding mode according to binary encoding. In addition, the level of occupancy observed in the buffer has emptied by two bits between the sample of index 13 and the sample of index 18.

From this observation of the change in the relative cost between the two encoding modes, the encoding mode of the next sample to be encoded, namely the sample of index 19, is derived therefrom. The change in the relative cost between the two encoding modes is decreasing, which signifies that the encoding mode previously used is effective. The encoding mode of the sample of index 19, identified by the variable MODE, is therefore unchanged and it is a case of Rice-Golomb encoding. This encoding mode, according to the algorithm, will be used for the window of six samples ranging from index 19 to index 24, provided however that the level of occupancy of the buffer remains above the predetermined threshold.

At the end of the encoding of the sample of index 19, the level of occupancy of the buffer passes from the value 58 to the value 53, a value below the predetermined threshold of value 56.

The level of occupancy of the buffer having become normal, the encoding of the image returns to a default encoding mode, this default encoding mode being, in this example implementation, Rice-Golomb encoding. The variable PANIC is therefore set to the value 0.

The sample of index 20 is next encoded according to the default encoding mode.

At the end of the encoding of the sample of index 20, the level of occupancy of the buffer passes from the value 53 to the value 66, and therefore the threshold is exceeded.

The variable PANIC is then set to the value 1 and the variable MODE is initialized to the value 0. As described previously, the sample of index 21 and the samples of the current window ranging from the sample of index 21 to the sample of index 26 are encoded according to the Rice-Golomb encoding mode.

Likewise, the encoding of these samples is simulated according to the binary encoding mode in order to evaluate the relative cost between the two encoding modes.

At the end of the encoding of the current window, it is perceived that the relative encoding cost is positive, signifying thereby that the binary encoding mode would be more effective than the Rice-Golomb encoding mode. This is because it can be observed that the level of occupancy of the buffer has continued to increase instead of decreasing.

The change in relative cost between the two encoding modes being on the increase, the encoding mode previously used is ineffective, and the encoding mode of the new sample of index 27, identified by the variable MODE, must therefore be changed.

For this purpose the variable MODE takes the value 1, thus identifying, in the example considered, binary encoding as the new encoding mode.

The new encoding mode is therefore applied to the current sample of index 27 as well as to the following five samples, that is to say as far as the sample of index 32, not shown in FIG. 5.

In parallel with this encoding, an encoding according to the Rice-Golomb encoding is simulated on the aforementioned samples, making it possible at each step to determine the relative cost between the two encoding modes.

At the end of the encoding of the window of samples ranging from index 27 to index 32, a new study of the change in the relative cost of the two encoding modes is carried out in order to determine whether binary encoding seems appropriate for reducing the level of occupancy of the buffer.

The digital image has been encoded with the algorithm of FIG. 4.

Figure 6:
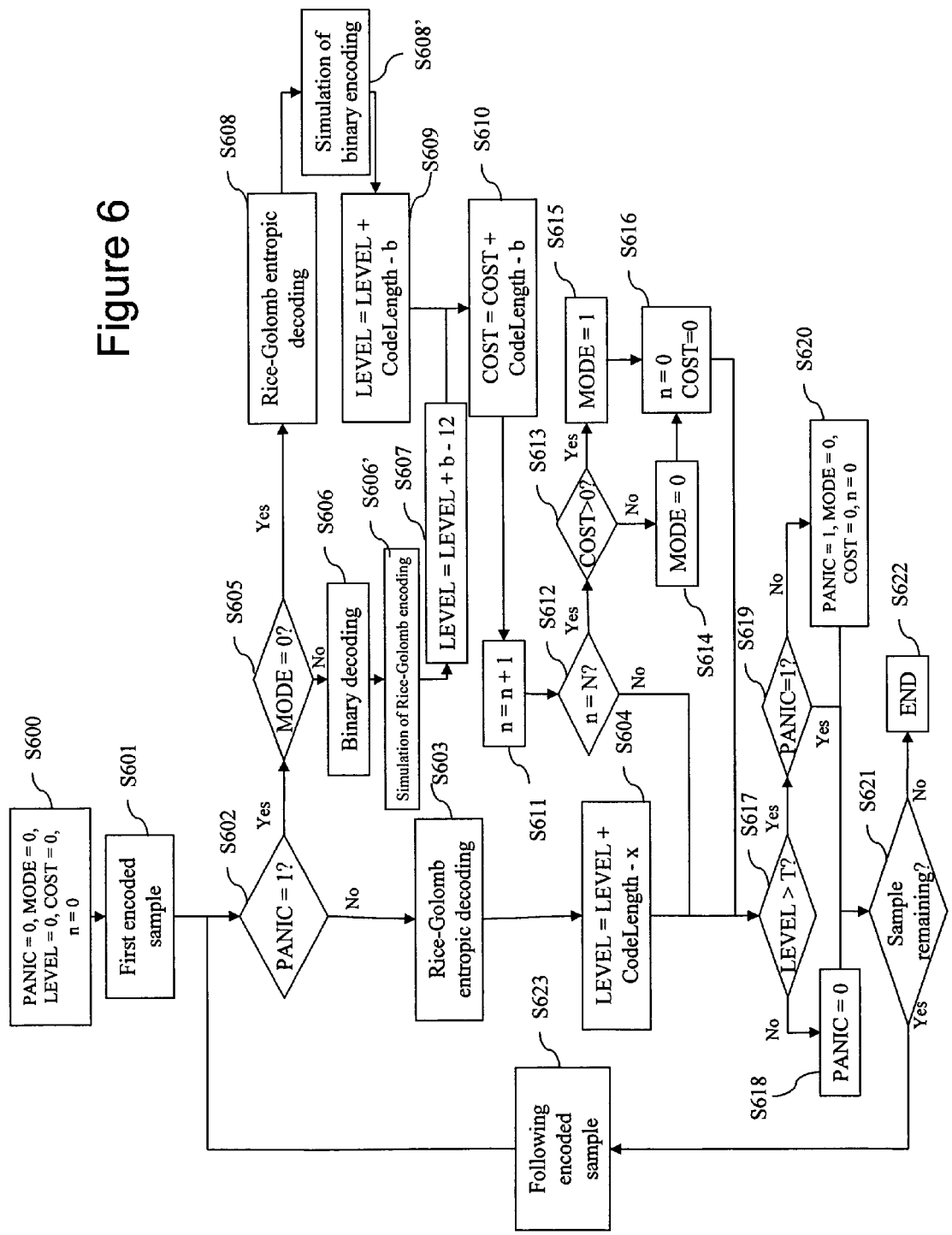
FIG. 6 is an algorithm of an embodiment of the decoding method according to the first aspect of the invention.

With reference to FIG. 6, a description is now given of a first method of decoding the encoded digital image according to the invention, which is implemented in the decoder.

The principle of this decoding method is based on a simulation of the encoding method. This is because simulating the encoding makes it possible to possess the same information on decoding the encoded current sample as during the encoding of the sample.

As depicted in FIG. 6, the processing of the decoding process according to the invention commences with a step of initializing a certain number of variables (step S600).

Thus step S600 consists of initializing the following variables to 0: PANIC, MODE, COST, LEVEL and n.

As described previously, the variable PANIC takes for example the value 0 when the level of occupancy of the buffer is below a predetermined threshold and the value 1 when the level of occupancy is above the predetermined threshold.

The variable LEVEL represents the simulation of the level of occupancy of the buffer when the encoding process has been applied with a view to encoding the image. The variable MODE identifies a particular decoding mode from amongst a plurality of decoding modes. For example, the variable MODE takes the value 0 in order to identify Rice-Golomb decoding and the value 1 to identify binary decoding.

The variable COST represents the relative cost of the simulation of the encoding according to a first encoding mode compared with the simulation of the encoding according to a second encoding mode of the encoded current sample or of the encoded samples of the current window.

According to a variant, the encoding cost is associated with each encoding mode of the sample, for example a encoding cost is associated with the encoding of the current sample according to the encoding mode used for encoding the current sample and a second encoding cost is associated with the encoding simulation of the current sample according to at least one encoding mode chosen from amongst a plurality of encoding modes.

Step S601 is then executed in order to select the first encoded current sample with a view to its decoding.

This step is then followed by a first test of checking the status (S602) according to which the method according to the invention is implemented. This status reflects the state of the simulation of the level of occupancy of the buffer, and is represented by the variable PANIC.

If the variable PANIC has the value 0, then the simulated buffer has not reached the critical occupancy threshold and therefore it is deduced therefrom that the current sample was encoded according to the default encoding mode. Thus the decoding mode to be applied with a view to decoding this encoded current sample is the default decoding mode.

As previously defined for the encoding, the default decoding mode is the Rice-Golomb decoding mode.

The entropic decoding of the encoded current sample is carried out during step S603.

The prediction step performed during the encoding is reproducible during decoding. Once this has been done, the order k which will be used during the Rice-Golomb decoding is defined as the number of significant bits of $Z_i$.

Next the encoded current sample is decoded according to the Rice-Golomb decoding from the order k obtained.

The value of the order k being defined, it is possible to proceed with the following calculation of $Y_i$:

$Y_i = U \times 2^k$, where $U$ is the prefix read.

Next the method makes provision for extracting the k bits from the data stream, these k bits forming a binary representation B. The value corresponding to this binary representation B is then added to $Y_i$. $Y_i$ is therefore obtained in the following manner:

$Y_i = U \times 2^k + B$.

Next recorrelation is performed in order to proceed with the scheme which is the reverse of that described during the decorrelation step, a step performed during encoding.

For example, a first order autoregressive decoding is carried out in the following manner:

$X_i = Y_i + X_{i-1}$

According to the example previously defined, the step of recorrelating each channel by prediction can take the following form:

$R_i$ = Estimation of $R_i + R_{i-1}$ $G_i$ = Estimation of $G_i + G_{i-1}$ $B_i$ = Estimation of $B_i + B_{i-1}$ Next the length CodeLength of the Rice-Golomb code is determined in order to be used during the following step S604. The function of this step is to update the simulation of the level of occupancy of the buffer represented by the variable LEVEL. This variable is updated by increasing the variable LEVEL by the value of CodeLength minus the size of the communication bus 32.

According to the example previously considered, the size of the communication bus is 12, and thus the variable LEVEL is therefore updated by increasing the value of CodeLength minus 12.

Step S604 is followed by step S617, which will be described below.

Returning to step S602, when the variable PANIC has the value 1, which signifies that the simulation of the level of occupancy of the memory has reached a critical occupancy threshold, the algorithm continues at step S605.

During this step, the decoding mode which is to serve for decoding the encoded current sample is tested.

If the variable MODE takes the value 0, then the encoded current sample undergoes decoding according to the Rice-Golomb decoding mode (step S608), otherwise the encoded current sample undergoes a decoding according to the binary decoding mode (step S606).

Following step S606, the encoding of the decoded current sample according to Rice-Golomb encoding is simulated (step S606') in order to determine the length of the Rice-Golomb code.

The length of the Rice-Golomb code is used subsequently (step S610) in order to evaluate the relative cost of the two encoding modes.

During encoding, in order to regulate the quantity of data produced by the encoding device, this device attempts to select an adapted encoding mode from amongst a plurality of encoding modes, in order to reduce the level of occupancy of this buffer without losing data. Thus, during decoding, the decoding device determines the encoding mode used during the encoding process in order to execute the reverse process with a view to decoding the encoded current sample.

Step S606' is followed by step S607 performing the calculation of the simulation of the level of occupancy of the buffer.

In the example in question, the variable LEVEL is updated by increasing the variable LEVEL by the value b minus 12, 12 being the size of the communication bus and b the size of the binary encoding.

As described previously, the binary value of the sample $X_i$ is written in b bits. Thus the variable LEVEL is increased by the value b minus 12.

Step S607 is followed by step S610, which will be described later.

Returning to step S605, when the variable MODE takes the value 0, this step is followed by step S608, consisting of performing the decoding of the encoded current sample according to a Rice-Golomb decoding.

The Rice-Golomb decoding carried out at step S608 is similar to the Rice-Golomb decoding performed at the previously described step S603.

As at step S606, following on from step S608, the encoding of the decoded current sample is simulated according to the binary encoding for determining the length of the code (step S608'). Given that the binary encoding is of fixed length, this simulation is made optional.

Step S608' is followed by step S609, consisting of determining the simulated level of occupancy of the buffer at the end of the step of encoding the encoded current sample according to a Rice-Golomb encoding during the encoding process.

For this purpose, the variable LEVEL is increased by the length of the Rice-Golomb code and decreased by the size of the communication bus, said bus transporting some of the data output by the encoding device.

Step S609 is followed by step S610 according to which the variable COST is updated by adding to it the length of the Rice-Golomb code, denoted CodeLength, minus the length of the simulated binary code.

The variable COST thus corresponds to the relative cost of a Rice-Golomb code compared with the simulated binary code for encoding the same sample.

Step S610 is then followed by step S611 consisting of incrementing by one unit the variable n representing the number of decoded samples of the current window.

The following step S612 makes provision for checking whether all the N samples of the current window have been decoded.

If not all the samples of the window have been decoded then the following step is step S617, which will be described later.

In the contrary case, during the encoding process, it has been estimated that sufficient samples have been decoded and therefore the encoding mode can be re-evaluated. The decoding must determine the way in which the encoding mode was re-evaluated in order then to decode the following encoded sample.

For this purpose, step S612 is followed by step S613 consisting of testing the variable COST.

If the variable COST is greater than 0, this means that, during encoding, the Rice-Golomb codes have produced more bits than the binary codes, and then the samples of the following window have been encoded according to a binary encoding. Thus it is deduced from this, for the decoding process, that the following samples must be decoded according to a binary decoding.

Thus at step S615 the variable MODE is positioned at the value 1 indicating the decoding mode of the next encoded sample.

In the contrary case, the samples of the following window have been encoded according to the Rice-Golomb encoding mode and it is deduced therefrom that the samples of the following window must be decoded according to the Rice-Golomb decoding mode. Step S614 positioning the variable MODE at the value 0 indicates the decoding mode of the next encoded sample.

According to the variant in which the encoding cost is associated with each encoding mode of the sample, step S613 consists of comparing the encoding costs associated on the one hand with the encoding of the current sample and on the other hand with the encoding according to the simulated encoding mode. The decoding mode to be applied to the following samples is the mode whose encoding cost is minimum.

Steps S614 and S615 are both followed by the step S616 of resetting to zero the variables n and COST, the variable n serving as an index of encoded samples in the current window, and the variable COST for calculating the encoding cost.

Step S616 is followed by step S617, consisting of checking whether or not the simulated level of occupancy of the buffer is higher than the predetermined threshold T.

If the check is negative, then the variable PANIC is set to the value 0 at step S618, indicating thereby that the simulated level of occupancy of the buffer is below the predetermined threshold. This step is then followed by the step S621 described later.

If the check is positive, then the status of the variable PANIC is tested during step S619.

If the variable PANIC reflects a normal operating mode (PANIC=0), then step S619 is followed by the step S620 of initializing various variables. The variable PANIC is set to 1 in order to indicate that the simulated level of occupancy has exceeded the predetermined threshold.

Next the variables MODE, COST and n are set to 0, and this step is followed by step S621.

Returning to step S619, when the variable PANIC has the value 1, this reflects the fact that the simulated level of occupancy of the buffer is above the predetermined threshold, and then this step is followed by step S621 mentioned above.

Step S621 consists of testing whether there remain samples to be decoded in the image.

In the negative, the algorithm is ended with step S622.

In the contrary case, the encoded sample according to the image is selected, at step S623.

A first variant embodiment of the encoding algorithm may be implemented so as to reduce any risk of overflow of the buffer memory.

To do this, an additional test is provided for detecting whether the buffer memory receiving the encoded data has reached a second threshold of occupancy so as to impose, in the affirmative, encoding with a predetermined fixed length encoding mode.

Figure 7:
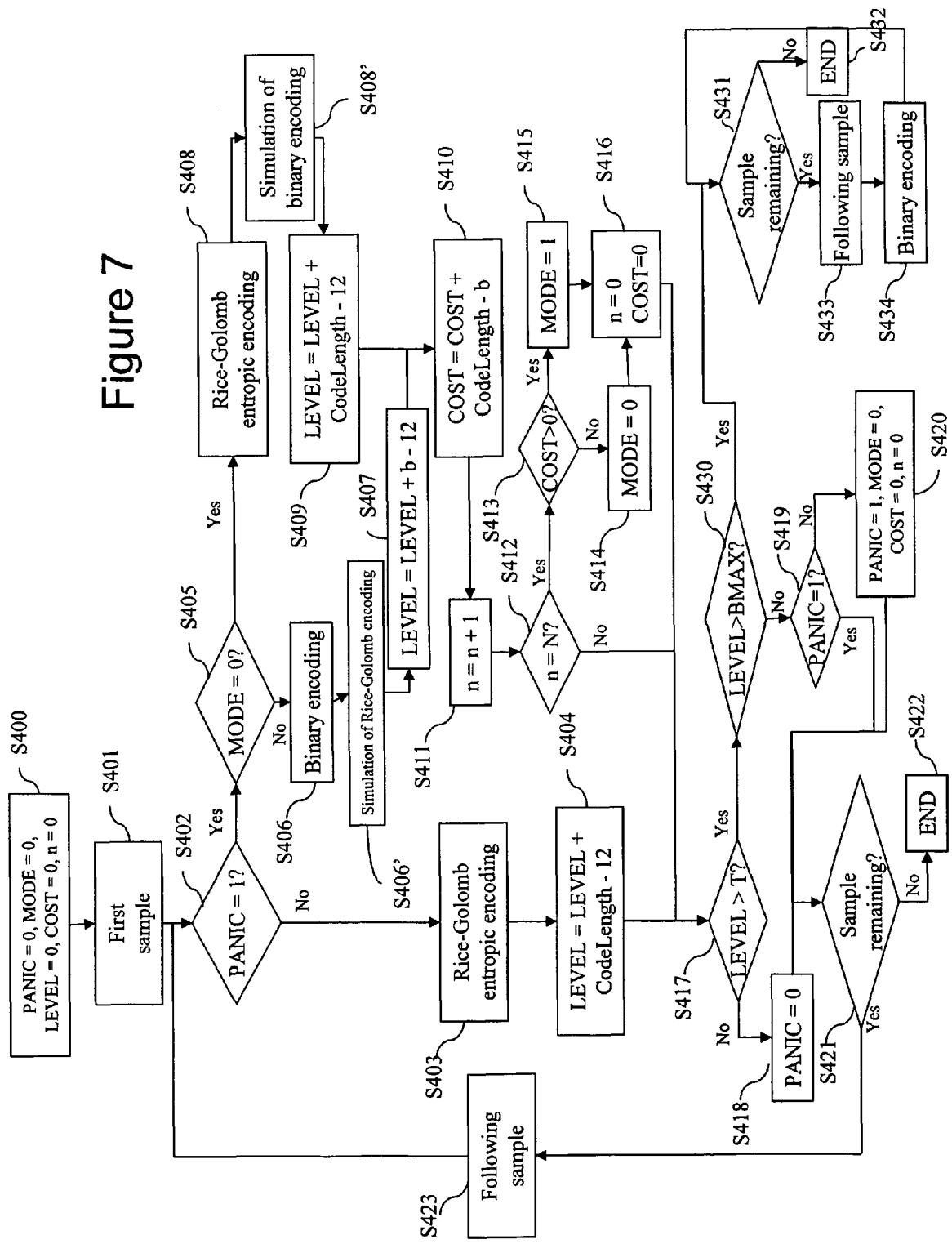
FIG. 7 is a first variant of the encoding algorithm of FIG. 4.

In FIG. 7 illustrating this variant, the steps similar to those of FIG. 4 have identical references. Steps S430 to S434 which are specific to this variant have been added.

Step S430 tests whether the value of the level of occupancy of the buffer memory is greater than a second predetermined threshold BMAX. The value of the threshold BMAX is, for example, calculated by subtracting the maximum possible length of a Rice-Golomb code from the total size of the buffer memory. The value of the second predetermined threshold BMAX is greater than the value of the first predetermined threshold T.

If the result of the test is negative, the algorithm continues as step S420 described previously with reference to FIG. 4.

If, on the other hand, the verification is positive, it is tested at step S431 whether there remain samples to encode in the image.

In the negative, the algorithm is made to terminate by step S432.

In the opposite case, at step S433, the following sample of the image is selected and becomes the new current sample.

Step S433 is then followed by the step S434 of encoding the current sample with a predetermined fixed length encoding mode (e.g. binary encoding).

Next, steps S431, S433 and S434 are reiterated for as long as there remain samples to encode in the image.

According to this variant embodiment, the level of maximum occupancy of the buffer memory is reduced and any overflow of the capacity of the buffer memory is thus avoided.

Figure 8:
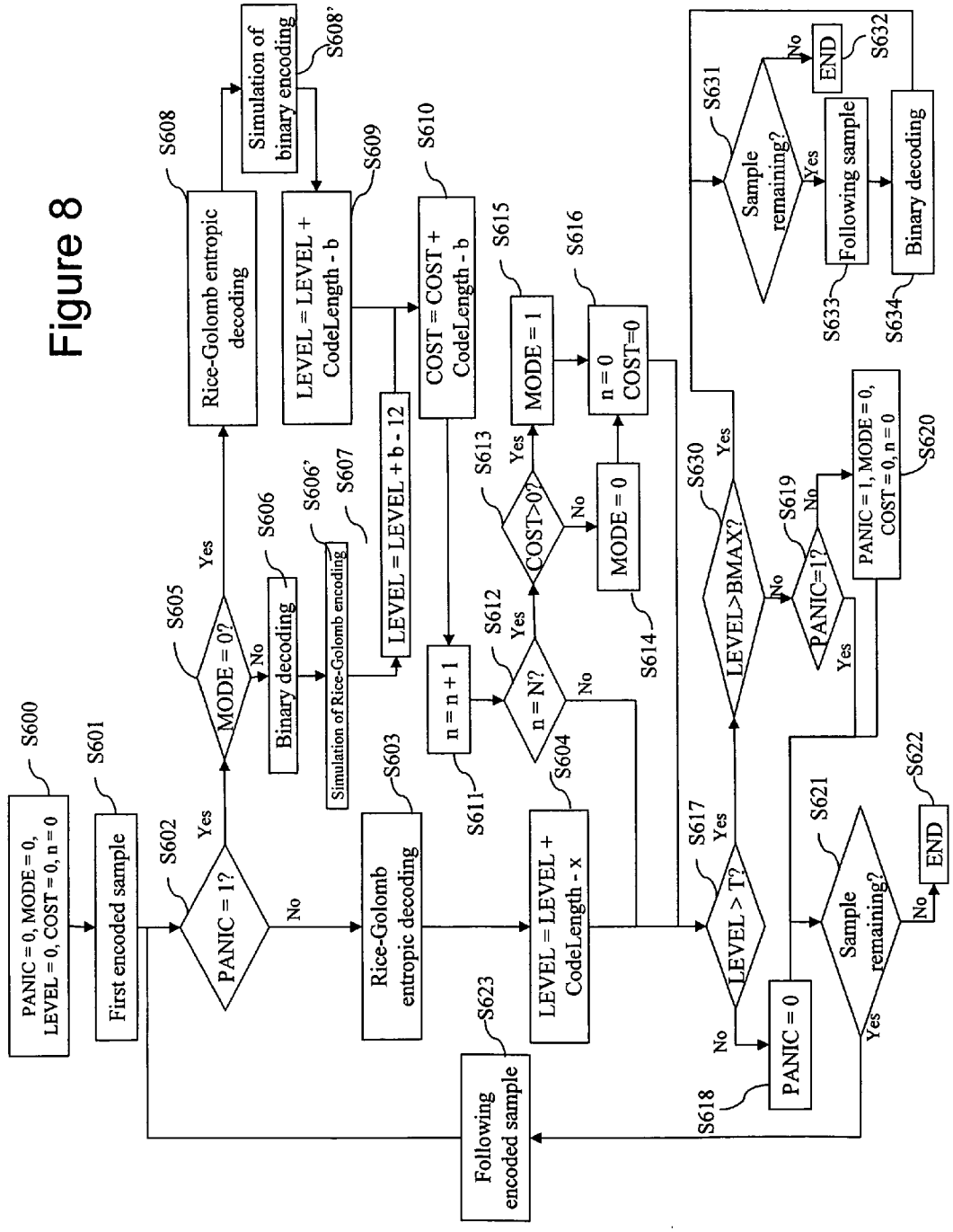
FIG. 8 is a first variant of the decoding algorithm of FIG. 6.

With reference to FIG. 8, a description is now given of the method of decoding the digital image encoded according to the first variant embodiment (FIG. 7) and which is implemented in the decoder.

In FIG. 8 illustrating this variant, the steps similar to those of FIG. 6 have identical references. Steps S630 to S634 have been added.

Step S630 tests whether the value of the level of occupancy of the buffer memory is greater than the second predetermined threshold BMAX, the value of the second predetermined threshold BMAX being greater than the value of the first predetermined threshold T.

If the result of the test is negative, the algorithm continues as step S619 described previously with reference to FIG. 6.

If, on the other hand, the result of the test is positive, it is tested at step S631 whether there remain samples to decode in the image.

In the negative, the algorithm is made to terminate by step S632.

In the opposite case, at step S633 the following sample of the image is selected and becomes the new current sample.

Step S633 is then followed by the step S634 of decoding the current sample with a predetermined fixed length decoding mode (e.g. binary decoding).

Next, steps S631, S622 and S634 are reiterated for as long as there remain samples to decode in the image.

Given that, during decoding, the simulation of the encoding device has a hardware cost, a variant may be envisaged.

According to this second variant, the encoding device can enter, during the writing of the encoded sample, the encoding mode used for encoding this sample.

Figure 9:
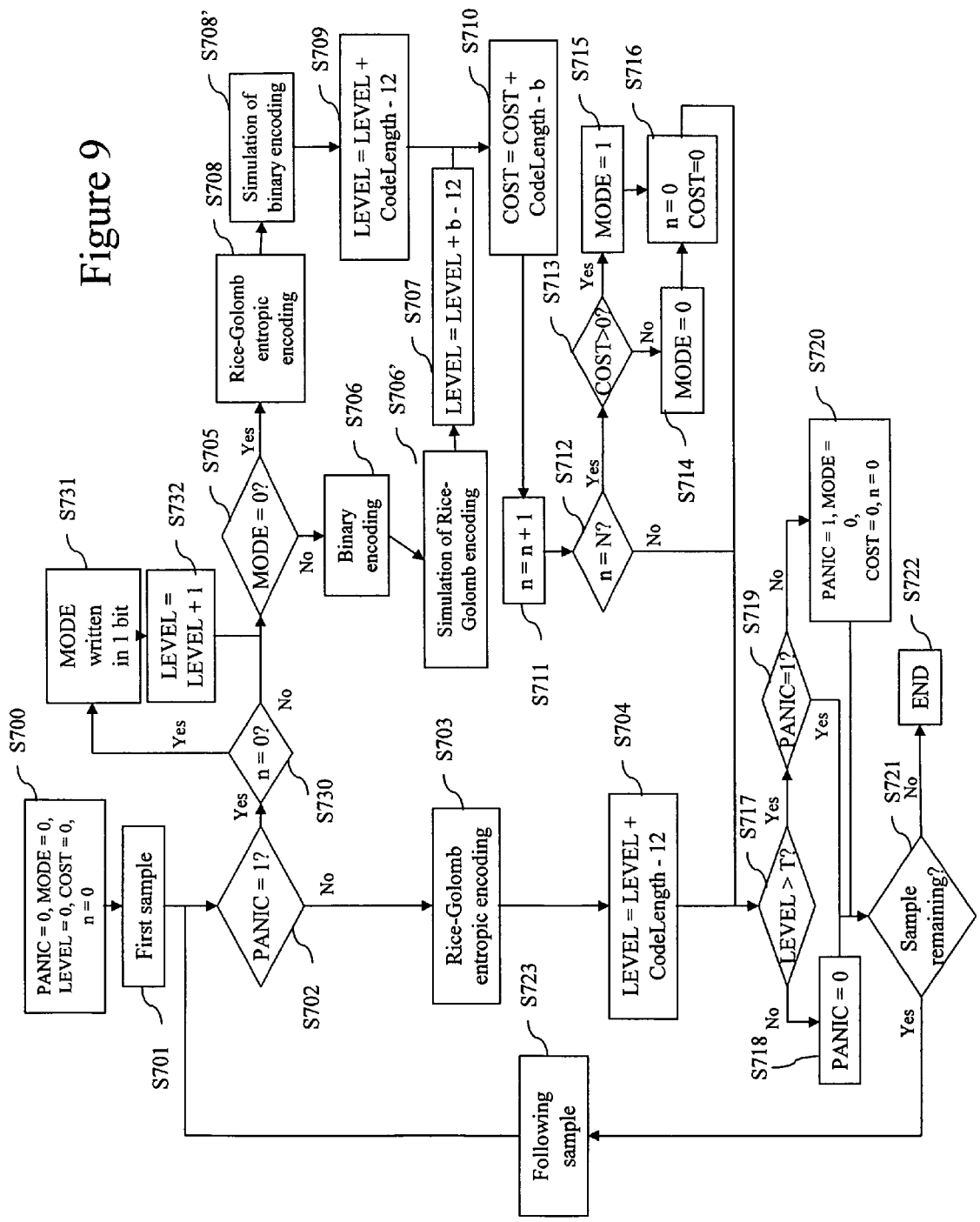
FIG. 9 is a second variant of the encoding algorithm of FIG. 4.

In FIG. 9 illustrating this variant, steps S700 to S723 are similar to steps S400 to S423, and steps S730, S731 and S732 are added.

Step S730 tests the value of the variable n. If this value is different from 0 then the following step is step S705. In the contrary case, that is to say the current sample is the first sample of the window of samples to be encoded, step S730 is followed by step S731. The role of this step is to enter information representing the encoding mode, in one bit, this information being the value of the variable MODE. This bit is associated either with the sample to be encoded or with a window of samples to be encoded.

Step S731 is followed by step S732 incrementing by the value 1 the variable LEVEL representing the binary element representing the encoding mode to be inserted in the buffer.

Adding this information causes the transmission of additional bits but however greatly simplifies the decoder.

Figure 10:
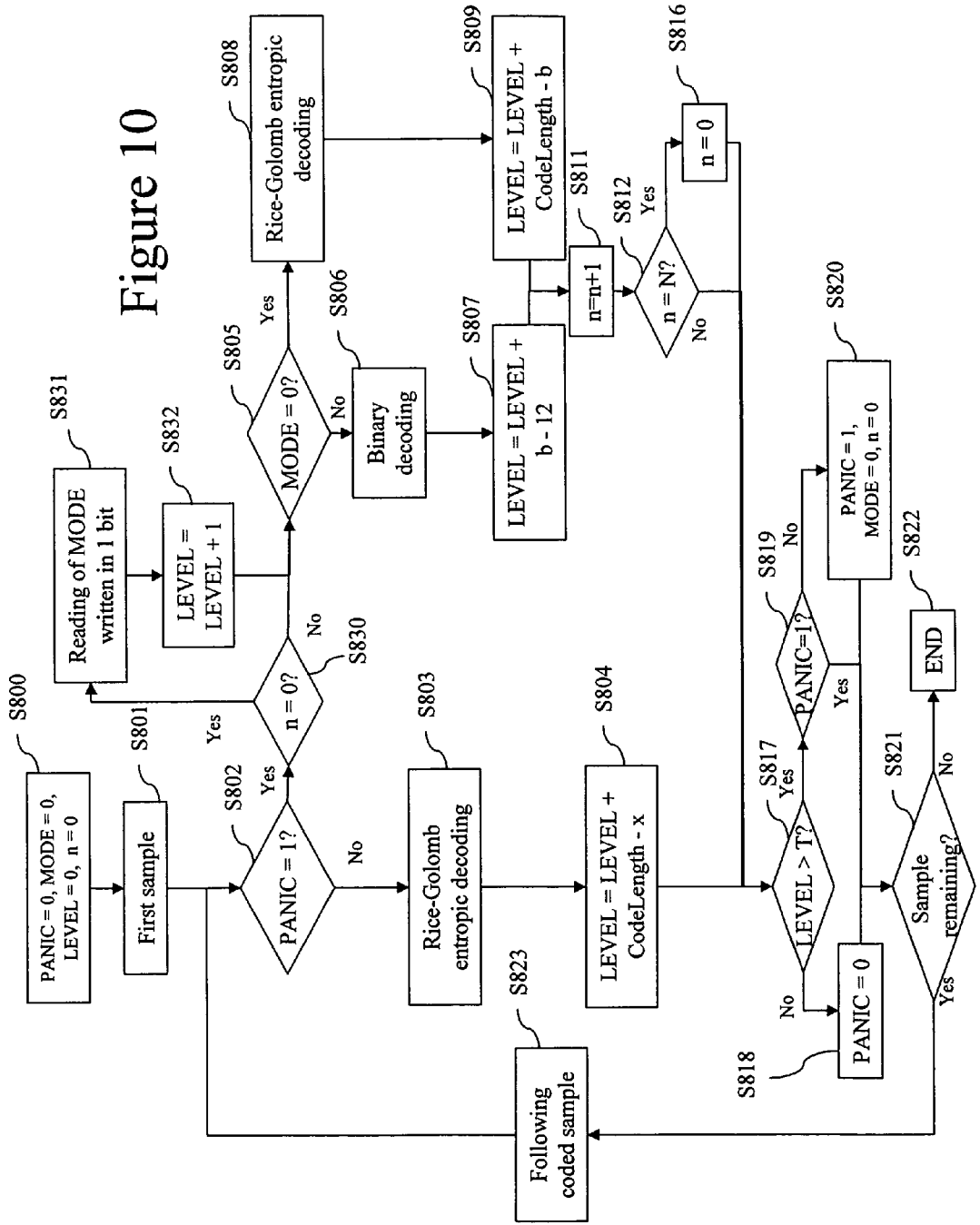
FIG. 10 is a second variant of the decoding algorithm of FIG. 6.

The corresponding decoding method is illustrated in FIG. 10.

As depicted in FIG. 10, steps S800 to S823 are similar to steps S600 to S623, with the exception of steps S610, S613, S614 and S615, which are not repeated. Steps S830, S831 and S832 corresponding to steps S730 to S732 are added.

When the variable PANIC takes the value 1, at step S802, this step is followed by the step S830, consisting of testing the value of the variable n. If this value is different from 0, then the following step is step S805. In the contrary case, that is to say the encoded current sample to be decoded is the first sample of the window of samples to be decoded, step S830 is followed by step S831, consisting of reading the information representing the encoding mode of the encoded following sample or of the window of encoded following samples, this information being encoded in one bit. Step S831 is followed by step S832 incrementing the variable LEVEL by the value 1, this value being the bit representing the encoding mode inserted in the buffer during the encoding process.

Thus, in this embodiment, the decoding is greatly simplified, at the expense of an additional cost in bits transmitted in the encoded file.

Figure 11:
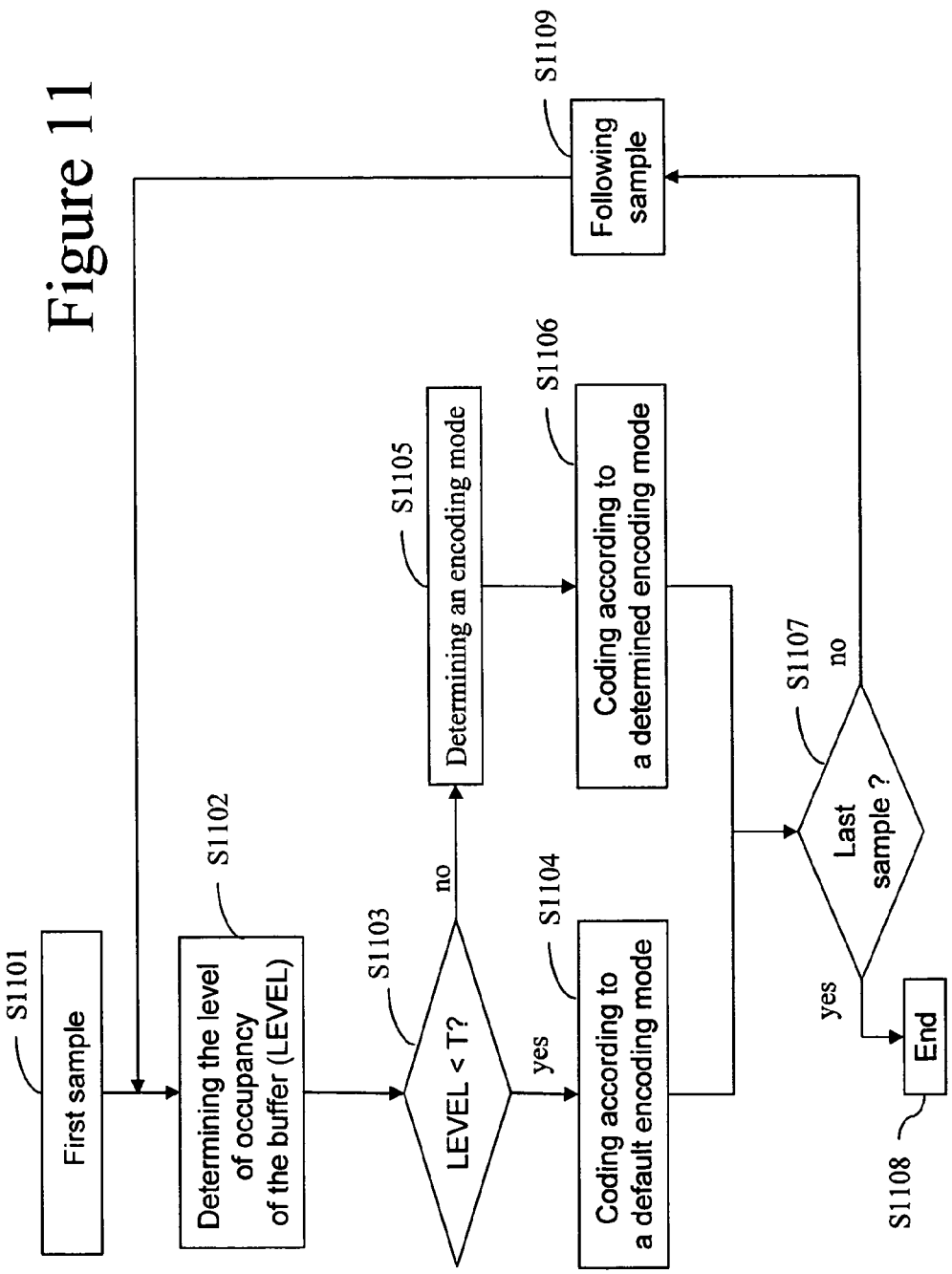
FIG. 11 is a simplified variant of the encoding algorithm of FIG. 4.

With reference to FIG. 11, a simplified variant embodiment is described of the preceding algorithms for the encoding of a digital image. In the processing loop of the sample to encode, prior to the encoding of that sample, this variant provides for determining the level of occupancy of the buffer memory and if necessary for determining the encoding mode of that sample.

As represented in FIG. 11, the processing of the encoding process according to this variant consists of selecting the first sample of the signal of the digital image for the purpose of encoding it (step S1101).

This step is followed by a step of determining the level of occupancy LEVEL of the buffer memory (step S1102). This level represents the level of occupancy of the buffer memory at the end of the encoding of the previous sample.

Next, at step S1103, it is tested whether the level of occupancy of the buffer memory is less than the predetermined threshold T.

If the result of the test is positive, the current sample is encoded at step S1104 with a default encoding mode. This step is then followed by step S1107 which will be described later.

If, on the contrary, the result of the test is negative, the encoding mode to use for encoding the current sample is then determined from a plurality of encoding modes (step S1105).

This step is then followed by a step S1106 of encoding the current sample with the encoding mode thus determined.

This step S1106 is followed by step S1107 consisting of testing whether there remain samples to encode in the image.

In the negative, the algorithm is made to terminate by step S1108.

In the opposite case, at step S1109, the following sample of the image is selected and becomes the new current sample.

Figure 12:
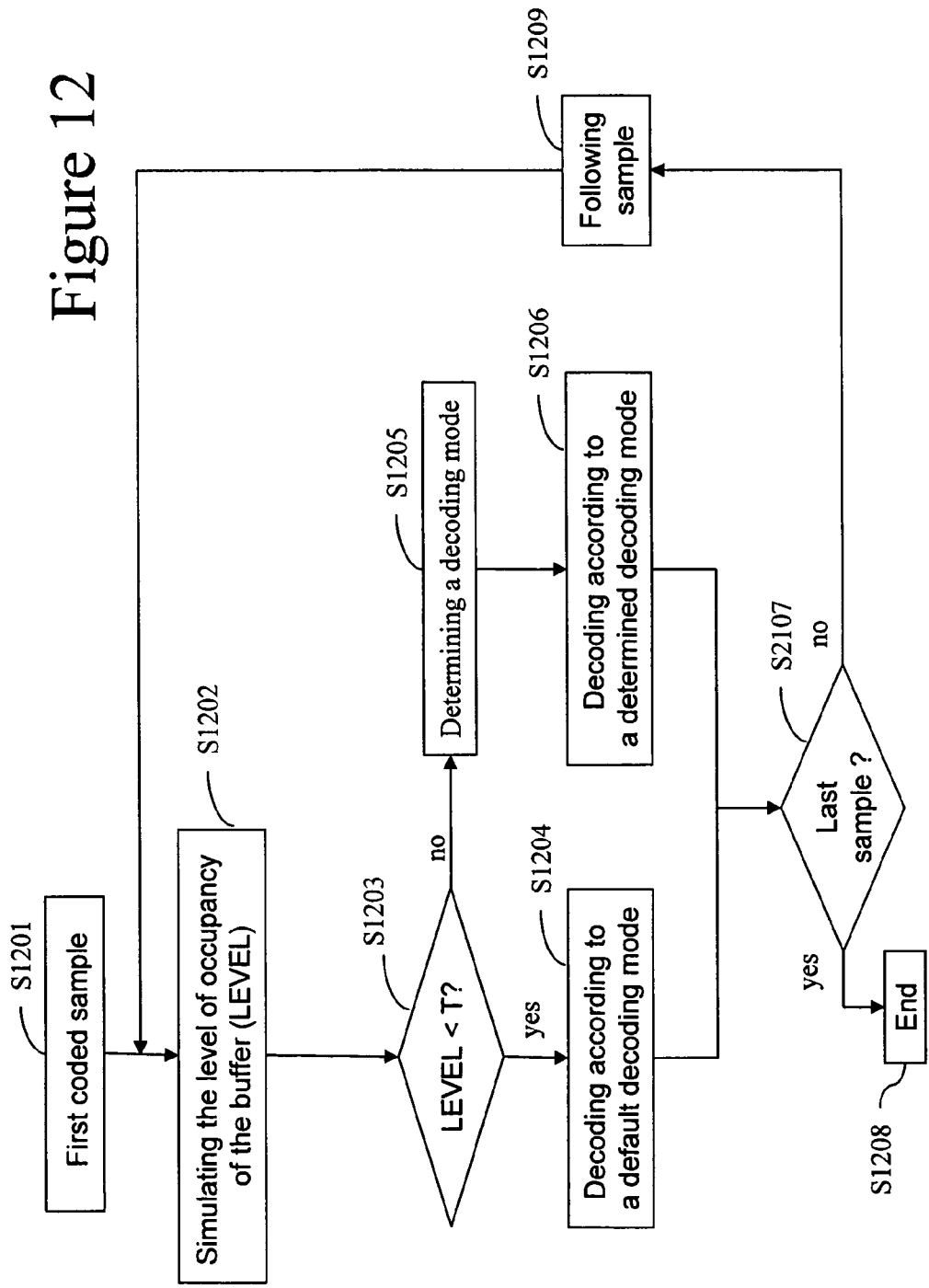
FIG. 12 is a simplified variant of the decoding algorithm of FIG. 6.

With reference to FIG. 12, a description is now given of the decoding process corresponding to the encoding process described with reference to FIG. 11.

As represented in FIG. 12, the processing of the decoding process according to this variant consists of selecting the first encoded sample of the signal of the digital image for the purpose of decoding it (step S1201).

This step is followed by a step of simulating the level of occupancy LEVEL of the buffer memory (step S1202). This level represents the simulated level of occupancy of the buffer memory at the end of the encoding of the previous sample during the encoding process.

Next, at step S1203, it is determined whether the level of simulated occupancy of the buffer memory is less than the predetermined threshold T.

If the result of the test is positive, at step S1204, the current encoded sample is decoded with a default decoding mode. This step is then followed by step S1207 which will be described later.

If, on the contrary, the result of the test is negative, determination is then made of the decoding mode to use for decoding the current encoded sample (step S1205).

This step is then followed by a step S1206 of decoding the current encoded sample with the decoding mode determined.

This step S1206 is followed by step S1207 consisting of testing whether there remain encoded samples to decode in the encoded image.

In the negative, the algorithm is made to terminate by step S1208.

In the opposite case, at step S1209, the following encoded sample of the encoded image is selected and becomes the new current encoded sample.

According to a second aspect of the invention, second digital image encoding methods and digital image decoding methods will now be described with reference to FIGS. 13 to 16.

Figure 13:
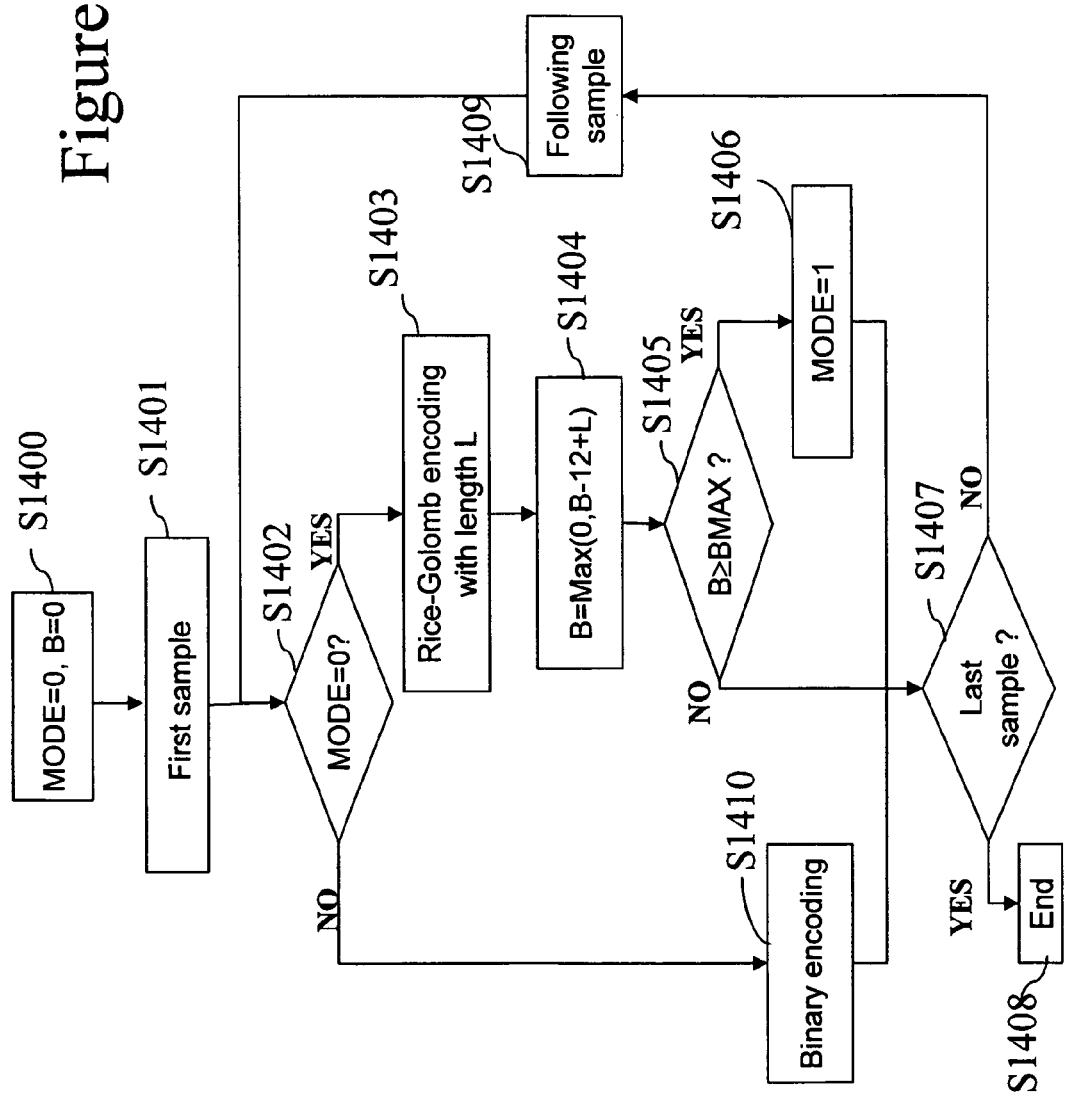
FIG. 13 is an algorithm of the encoding method according to a second aspect of the invention.

With reference to FIG. 13, a description will now be given of the method of digital image encoding according to the invention and which is implemented in the encoding device 100 of the encoder 10.

The encoding method encodes, in particular, a digital image captured by means of the CCD sensor ("Charge Coupled Device") of a digital camera, the CCD sensor transforming the light energy which passes through the lens into electrical energy.

In this embodiment, the digital image is divided into several rows of samples, in the natural order of scanning. Each row is then divided into a plurality of digital samples.

The data coming from the CCD sensor are generally data of light amplitude encoded over 12 bits.

Thus, at each clock cycle, it is thus the 12 bits of the current sample which are processed by the encoder.

The encoding method according to the second aspect of the invention makes provision for switching from a variable length encoding mode to a fixed length encoding mode when the output buffer memory of the encoder 10 has reached a predetermined threshold. The predetermined threshold is there to indicate that the buffer memory is mostly filled.

After the current encoding mode has switched to a fixed length encoding mode, the level of occupancy of the buffer memory remains constant, so guaranteeing that no overflow of the buffer memory will take place.

This switching is definitive, such that the remainder of the samples of the image to be encoded and which follow are encoded by means of a fixed length encoding mode.

According to this method, the encoding of the samples enables the buffer memory space to be optimized for the samples encoded before switching to the new encoding mode.

Thus, the choice of the size of the buffer memory must be made in such a way that the size of the buffer memory is sufficiently great for the new encoding mode to be involved only for a very low proportion of samples.

According to this method, use is however avoided of too large a buffer memory which would serve to avoid an overflow of that buffer memory solely for that very low proportion of signals.

As represented in FIG. 13, the processing of the encoding process according to the invention begins with the initialization of a certain number of variables at step S1400.

First of all, the variable MODE, representing the current encoding mode, is initialized to 0. This variable indicates the encoding mode to apply to the current sample, the mode being either a variable length encoding mode, or a fixed length encoding mode.

Furthermore, the variable MODE identifies a specific encoding mode among a plurality of possible encoding modes.

In particular, that variable takes the value 0 to indicate a variable length encoding mode, for example Rice-Golomb encoding, and the value 1 to identify a fixed length encoding mode, for example binary encoding.

Next, the variable B, the purpose of which is to measure the level of occupancy of the output buffer memory of the encoder, is initialized to 0.

Step S1400 is followed by step S1401 consisting of selecting the first sample of the signal of the digital image for the purpose of encoding it.

This step is followed by a test for verifying the encoding mode that should be used for encoding the current sample (step S1402).

If the variable MODE has the value 0, the encoding mode is a predetermined variable length encoding mode.

According to the example considered, the variable length encoding mode is the Rice-Golomb encoding performed at step S1403.

The current sample will thus be encoded using a Rice-Golomb entropy encoding described below.

On the contrary, if the variable MODE has the value 1, the algorithm continues with step S1410 and the encoding mode is a predetermined fixed length encoding mode.

By way of example, this fixed length encoding mode is binary encoding (step S1410).

Returning to step S1403, this provides for encoding the current sample using Rice-Golomb encoding.

However, other encoding modes may be used, in particular Huffman encoding or arithmetic encoding.

This step is followed by a step consisting of a calculation of order prediction for the Rice-Golomb codes.

At the end of the encoding, the encoded sample is sent to the output buffer memory of the encoder.

The length L of the encoded sample is determined in order to be used at the following step S1404 of updating the level of occupancy of the buffer memory.

To do this, the variable B representing the number of bits currently stored in the output buffer memory of the encoder is updated.

At the end of the preceding step (S1403), L bits have been stored in the output buffer memory of the encoder during one clock cycle. Simultaneously, 12 bits are extracted from the buffer memory for them to be processed by the processing unit located upstream.

It should be noted that if the buffer memory contains less than 12 bits, only the bits that are present are sent to the processing unit.

Consequently, at the end of that clock cycle, the new value of the variable B storing the level of occupancy of the buffer memory takes the value provided by the operation Max (0, B−12+L), where B represents the level of occupancy of the buffer memory at the end of the encoding of the preceding sample.

Step S1404 is followed by the test step on the variable B (step S1405).

During this step, it is tested whether the value of the variable B is greater than or equal to a predefined value BMAX. The value BMAX is, for example, calculated by subtracting the maximum possible length of a Rice-Golomb code from the total size of the buffer memory.

In practice, determination is made, in general, of a form of limitation of the maximum length that the Rice-Golomb code can reach.

Such an example of limitation of code size is given in the document by M. Weinberger, G. Seroussi, G. Sapiro, entitled "The LOCO-I Lossless Image Compression Algorithm: Principles and Standardization into JPEG-LS", Hewlett-Packard Laboratories Technical Report No. HPL-98-193R1, November 1998, revised October 1999. *IEEE Trans. Image Processing*, Vol. 9, Aug. 2000, pp. 1309-1324., in particular in paragraph 3.3.3 entitled "Limited-Length Golomb codes"

According to a specific example, if the maximum possible size of a Rice-Golomb code is 30 bits and if the size of the buffer memory is 256 bits, the variable BMAX has the value (256-30) i.e. 226.

Thus, if the level of occupancy of the buffer memory, stored in the variable B, is greater than or equal to BMAX, the value of the buffer memory is considered to be virtually full.

More particularly, there only remains the space in the buffer memory necessary for the writing of a Rice-Golomb code before changing the encoding mode and using a fixed length encoding mode, in particular binary encoding in the example considered.

In that case, step S1405 is followed by step S1406 of updating the variable MODE.

Otherwise (B<BMAX), the following step is the step S1407 which will be described below.

At step S1406, the variable MODE is set to the value 1 in order to encode the remainder of the samples of the image using a fixed length encoding mode, for example binary encoding, without however necessitating a test of the level of occupancy of the buffer memory.

This step is followed by the step S1407 providing a test in order to determine whether all the samples have been processed.

If the verification is positive, the encoding algorithm terminates at step S1408.

In the opposite case, step S1407 is followed by the step of selecting the following sample (S1409).

For this, the following sample in the image is selected, for example in lexicographical order, and becomes the new current sample.

Step S1409 is then followed by the previously described step S1402.

Returning to step S1402, when the variable MODE has the value 1, that step is followed by the step S1410 consisting of performing the encoding of the current sample using fixed length encoding, for example direct binary encoding based on the writing of the value of the current sample in base 2.

Other fixed length encoding modes may be used, for example, Gray encoding or Binary Coded Decimal (BCD) encoding.

For example, if the value of the current sample is 3487, its direct binary code over 12 bits is "110110011111".

At the end of this encoding step, the binary code is sent to the output buffer memory of the encoder.

This step S1410 is then followed by test step S1407 described earlier.

Figure 14:
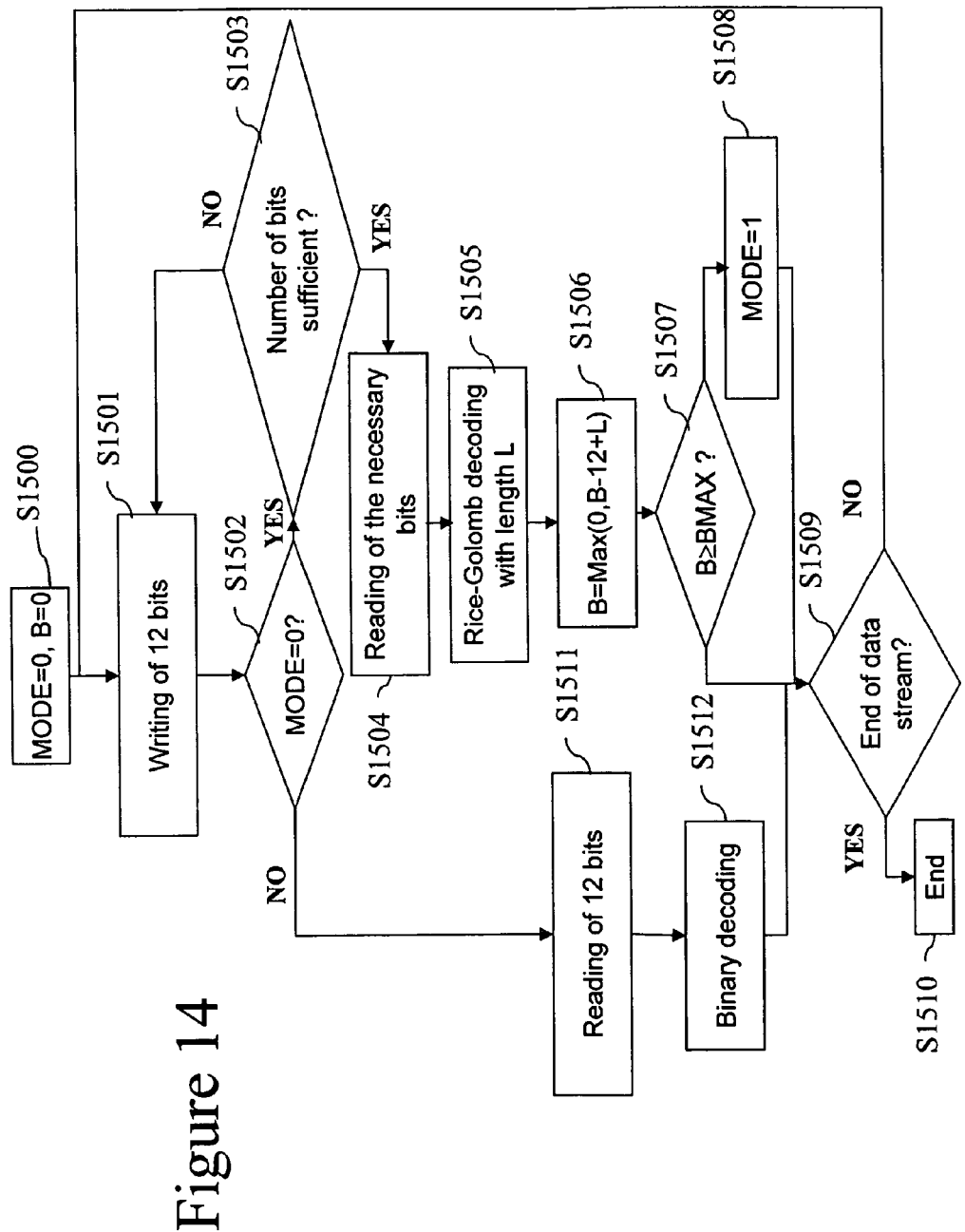
FIG. 14 is an algorithm of the decoding method according to the second aspect of the invention.

With reference to FIG. 14, a description is now given of the method of decoding the digital image encoded according to the second aspect of the invention and which is implemented in the decoder 12 of FIG. 1.

As represented in FIG. 14, the processing of the decoding process according to the invention begins with a step of initializing a certain number of variables (step S1500).

Thus, step S1500 consists of initializing the variables MODE and B to 0.

As described previously, the variable MODE representing the current decoding mode takes, for example, the value 0 when the decoding mode to use is a variable length decoding mode, and the value 1 when the decoding mode to use is a fixed length decoding mode.

According to the example considered, the variable length decoding mode is Rice-Golomb decoding and the fixed length decoding mode is binary decoding.

Next, the variable B, the purpose of which is to simulate the level of occupancy of the buffer memory on encoding the current sample, is initialized to 0.

Step S1500 is followed by step S1501 during which the decoder receives from the preceding device 12 data bits to decode.

These 12 bits are stored in an input buffer memory in order to be read and processed.

According to a variant, if the preceding device has its own output buffer memory, that step is not necessary and it suffices to read the data in the output buffer memory of the preceding device.

That step S1501 is followed by step S1502 consisting of testing the decoding mode that should be used for decoding the encoded current sample.

If the variable MODE has the value 0, the decoding mode is the predetermined variable length decoding mode.

According to the example considered, this variable length decoding mode is the Rice-Golomb decoding mode.

However, prior to the decoding, step S1502 is followed by step S1503 which provides for testing whether the number of bits present in the input buffer memory and corresponding to the encoded current sample is sufficient to perform Rice-Golomb decoding.

To do this, the length of the Rice-Golomb code to decode is given by the Rice-Golomb order and by the unary part of the code.

Thus, the stored unary code is read in the buffer memory, and then a first test is performed on the unary code read from the buffer memory.

The test consists of testing the presence of the unary code in its entirety, i.e. the series of bits at 1 terminated by a bit at 0.

If this test is positive, a second test is applied in order to determine whether k additional bits are available in the buffer memory, those k bits corresponding to the binary part of the code.

If the second test is positive, a sufficient number of bits necessary for the Rice-Golomb decoding of the current sample to decode is available. Step S1503 is then followed by step S1504 of reading and decoding the current sample to decode.

In the opposite case, i.e. if the first test or the second test is negative, there are insufficient bits in the buffer memory to perform Rice-Golomb decoding. In that case, step S1503 is followed by step S1501 described earlier.

At step S1504, the bits necessary for the Rice-Golomb decoding of the encoded current sample are read from the buffer memory, i.e. the bits of the unary codes and the k bits of the binary code of the encoded current sample, for the purpose of decoding them.

This step is followed by the step S1505 of decoding the bits read at the preceding step.

The entropy decoding of the encoded current sample is performed at step S1505 and is similar to the step S603 of FIG. 6.

Next, the length L of the Rice-Golomb code is determined in order to be used at the following step S1506.

The function of that step is to update the variable B representing the number of bits stored in the output buffer memory of the encoder at the time at which that device encodes the current sample.

During the preceding step (S1505), L bits were decoded during a clock cycle.

Simultaneously, the output buffer memory of the encoder empties out the 12 bits which will be processed by the processing unit situated downstream.

If the buffer memory comprises less than 12 bits, only the bits present are processed.

Consequently, at the end of the clock cycle, the new value of the level of occupancy of the output buffer memory of the encoder is Max (0, B−12+L), where the variable B represents the level of occupancy of the buffer memory at the end of the encoding of the preceding sample.

This step is followed by the step S1507 of testing the value of the variable B.

During that step, it is tested whether the value of the variable B, simulating the level of occupancy of the output buffer memory of the encoder, is greater than or equal to a predefined value BMAX.

The value BMAX is the value calculated at the time of the encoding method. Thus it is, for example, calculated by subtracting the number of bits read from the buffer memory during a clock cycle by the processing unit situated downstream, from the total size of the output buffer memory of the encoder.

In practice, if the size of the buffer memory is 256 bits and 12 bits are read during a clock cycle, then the value of BMAX is 244.

This, if the simulated level of occupancy of the output buffer memory of the encoder, stored in the variable B, is greater than or equal to BMAX, the output buffer memory of the encoder has become virtually full at that instant.

This is because in the output buffer memory of the encoder there only remains the space necessary for the writing and reading of a fixed length code, such as the binary code in the example considered.

In that case, step S1507 is followed by step S1508 of updating the variable MODE: the variable MODE is set to the value 1, in order to decode the remainder of the samples of the image using a fixed decoding mode, such as direct binary decoding in the example considered.

This step is followed by the test step S1509 determining whether the entire data stream has been processed. The same applies when B proves to be less than BMAX at the end of step S1507.

At step S1509, it is verified whether there are still bits to process.

If that is the case, the following step is step S1501 of writing 12 bits in the input buffer memory of the decoder, described previously.

In the negative, the decoding is terminated (S1510), so ending the decoding algorithm.

Returning to step S1502, when the variable MODE has the value 1, this step is followed by the step S1511, which provides for reading 12 bits from the input buffer memory of the decoder.

This step is followed by the step S1512 which makes provision for decoding the encoded current sample using fixed length decoding, such as binary decoding.

For this, the 12 bits read previously are converted to a value which is the decoding value of the encoded current sample.

This step is then followed by step S1509 already described.

Figures 15, 16:
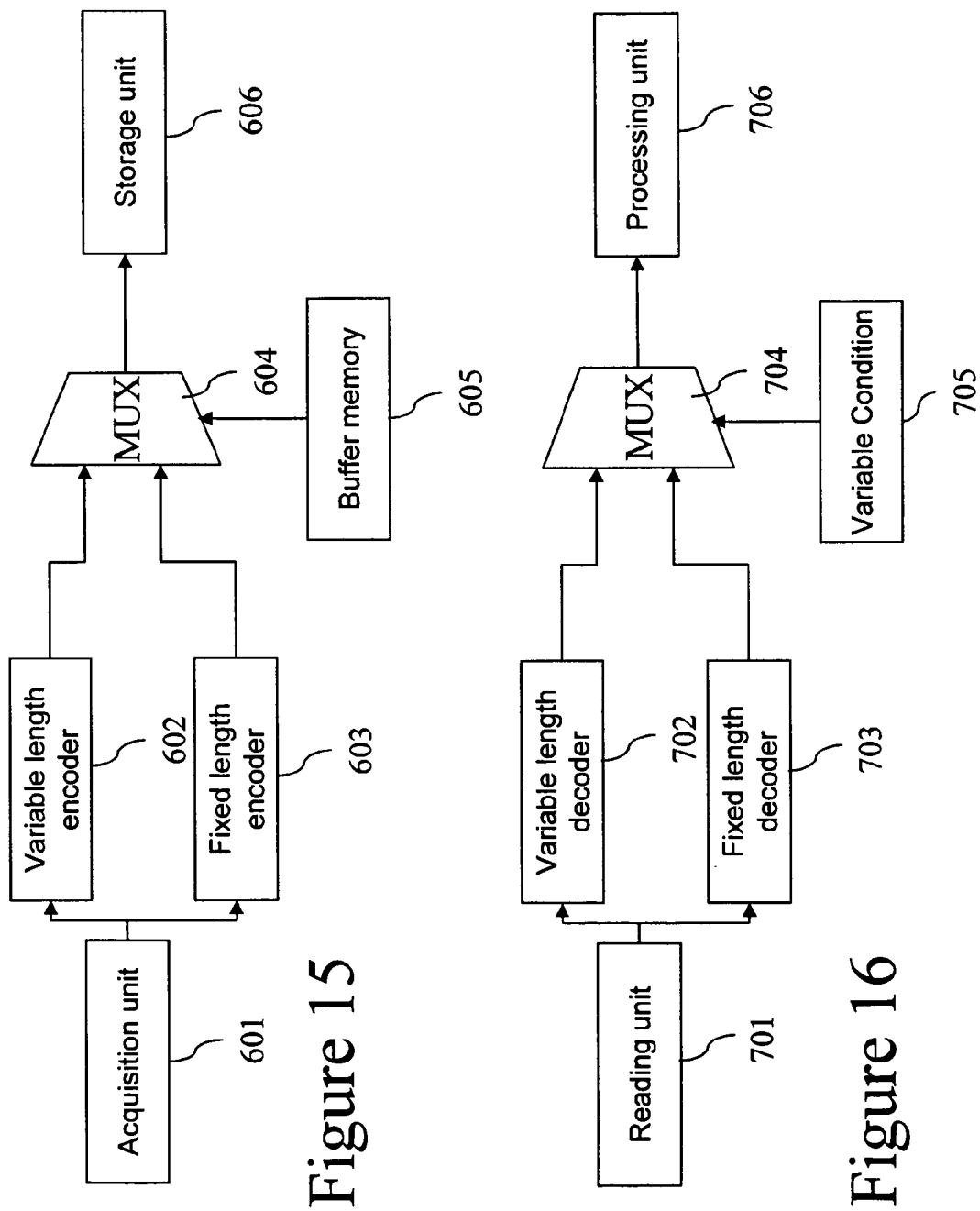
FIG. 15 is a diagram of an encoder in which the second aspect of the invention is implemented.
FIG. 16 is a diagram of a decoder in which the second aspect of the invention is implemented.

FIG. 15 represents an encoder adapted for the implementation of this second aspect of the invention.

A device for multimedia entity digital signal encoding according to the invention will now be described in a general manner, in terms of its hardware configuration, with reference to FIG. 15.

According to one embodiment, this device comprises an acquisition unit 601 providing the data of the samples of the image to encode to the units for variable length encoding 602 and fixed length encoding 603.

The data streams produced by these two encoding units are supplied to a multiplexer 604 which is controlled according to the level of occupancy of the output buffer memory 605 of the encoder.

The output from the multiplexer 604 supplies the data of the encoded sample to a processing unit 606, for example a storage unit.

FIG. 16 represents a decoder adapted for the implementation of the second aspect of the invention.

A device for encoded multimedia entity digital signal decoding according to the invention will now be described in a general manner, in terms of its hardware configuration, with reference to FIG. 16.

According to one embodiment, this device comprises a unit 701 for reading the data of image samples to decode supplying the units of variable length decoding 702 and fixed length decoding 703 the image sample data to decode.

The data stream produced by these two decoding units are supplied to a multiplexer 704 which is controlled by a unit 705. Unit 705 is adapted to simulate the level of occupancy of the output buffer memory of the encoder on encoding the current sample to decode.

The output of the multiplexer 704 supplies the data of the decoded samples to a processing unit 706, for example an image display unit.

Figure 17:
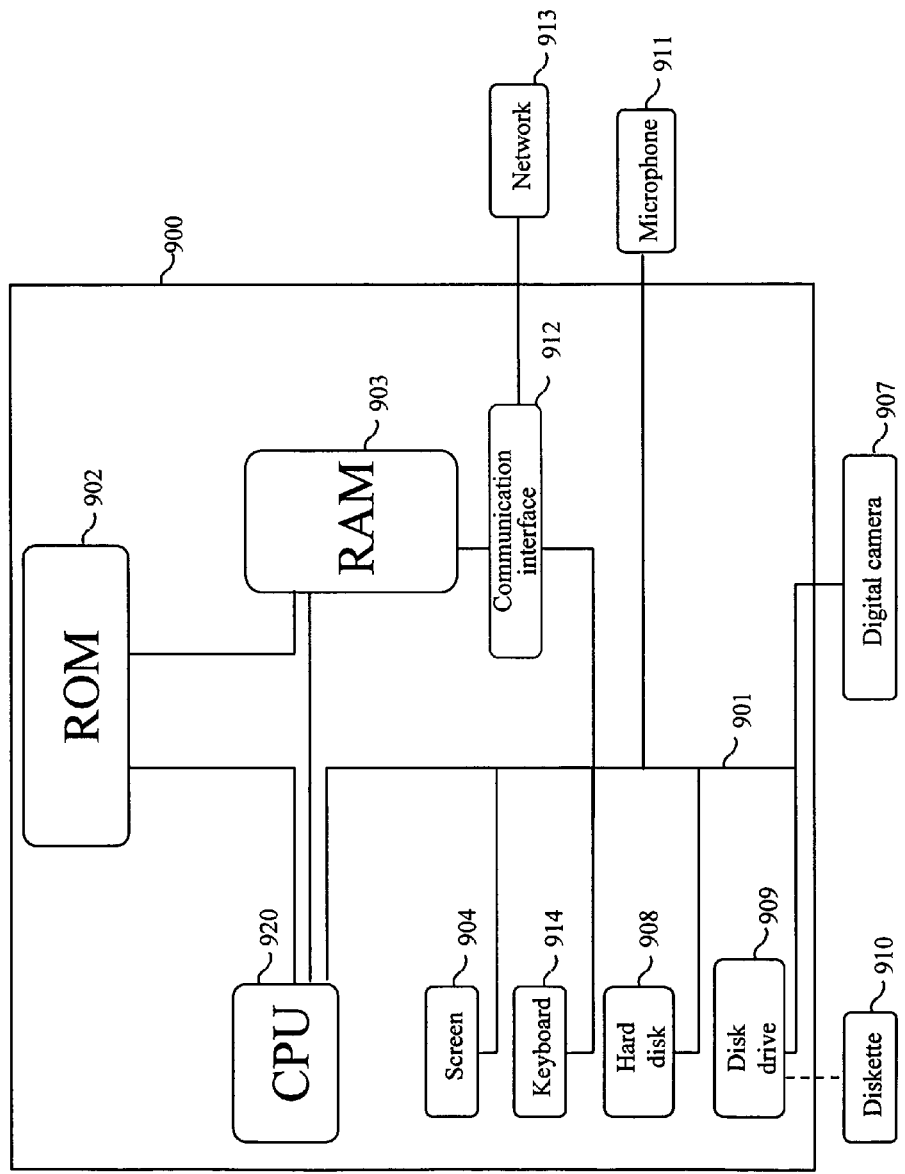
FIG. 17 depicts schematically an apparatus in which the first and second aspects of the invention are implemented.

With reference to FIG. 17, a device suitable for implementing the first and second aspects of the invention is described.

The device of FIG. 17 possesses all the means necessary for implementing example embodiments of the invention.

With reference to FIG. 17, an information processing machine or device able to function as a digital signal encoding device for a multimedia entity and/or a digital signal access and decoding device for a multimedia entity according to the first or second aspect of the invention is now described essentially in its hardware configuration.

The information processing device allows implementation of the digital signal encoding method for a multimedia entity and/or of the digital signal access and decoding method for a multimedia entity according to the first or second aspect of the invention. More precisely, an information processing device of this type is able to contain all or only some of the methods according to the first or second aspect of the invention described in the present application.

According to the embodiment chosen, this device can for example be a microcomputer 900 connected to various peripherals, for example a digital camera 907 (or a scanner, or any other image acquisition and storage means) connected to a graphics card and thus supplying the information to be processed according to the invention.

The microcomputer 900 preferably comprises a communication interface 912 connected to a network 913 able to transmit digital information. The microcomputer 900 also comprises a storage means 908, such as for example a hard disk, as well as a disk drive 909.

The diskette 910, like the disk 908, can contain software implantation data of the invention as well as the code of the invention which, once read by the microcomputer 900, will be stored on the hard disk 908.

According to a variant, the program or programs enabling the device 90 to implement the invention are stored in a read only memory ROM 902, and the same applies to the encoding/decoding methods.

As another variant, the program or programs are received totally or partially through the communication network 913 in order to be stored in an identical manner to that described above.

The microcomputer 900 can also be connected to a microphone 911 by means of an input/output card (not shown). The microphone 911 is useful in particular when the data to be processed in accordance with the methods of the invention are audio data.

The microcomputer 900 also comprises a screen 904 for displaying the information to be processed and/or serving as an interface with the user, so that the user can for example parameterize certain processing modes by means of the keyboard 914 or any other means, a mouse for example.

The central unit CPU 920 executes the instructions relating to the implementation of the invention, these instructions being stored in the read only memory ROM 902 or in the other storage elements described.

On powering up, the processing programs and methods stored in one of the non-volatile memories, for example the ROM 902, are transferred into the random access memory RAM 903, which will then contain the executable code of the invention as well as the variables necessary for implementing the invention.

In a variant, the processing methods can be stored in various storage locations of the device 900. In general terms, an information storage means which can be read by a computer or by a microprocessor, integrated or not into the device, possibly removable, stores a program implementing the access, encoding and decoding methods respectively. It will also be possible to modify an embodiment of the invention, for example, to an improved embodiment, by adding updated or improved processing methods which are transmitted by the communication network 913 or loaded by means of one or more diskettes 910. Naturally, the diskettes 910 can be replaced by any information medium such as a CD-ROM or memory card.

A communication bus 901 affords communication between the various elements of the microcomputer 900 and the elements connected to it. It should be noted that the representation of the bus 901 is not limiting. This is because the central unit CPU 920 is for example able to communicate instructions to any element of the microcomputer 900, directly or by means of another element of the microcomputer 900.

Naturally the present invention is in no way limited to the embodiments described and depicted but quite the contrary encompasses any variant within the capability of a person skilled in the art.

The invention claimed is:

1. A method of encoding a digital image signal comprising a plurality of samples, wherein the method comprises the following steps, applied during the encoding of each sample with a view to its storage in a buffer:
    determining the level of occupancy of the buffer;
    comparing the level of occupancy with a predetermined threshold;
    determining an encoding mode from amongst a plurality of encoding modes when the level of occupancy is above the predetermined threshold, and encoding the sample according to the determined encoding mode;
    encoding said sample according to a default encoding mode when the level of occupancy is below the predetermined threshold; and
    simulating the encoding of said sample to be encoded according to at least one encoding mode different from the determined encoding mode when the level of occupancy is above the predetermined threshold.

2. The method according to claim 1, wherein the determined encoding mode is used for the encoding of a predetermined number of samples following said sample to be encoded, the predetermined number of samples following said sample to be encoded being called following samples.

3. The method according to claim 2, wherein the determination of an encoding mode of at least one following sample to be encoded is a function of the evaluated encoding costs associated with the encoding of at least one sample preceding said at least one following sample to be encoded and comprises the selection of the encoding mode whose evaluated encoding cost, associated with the encoding of said predetermined number of samples preceding said at least one following sample to be encoded, is minimum.

4. The method according to claim 2, further comprising a step of associating with said following samples an item of information representing the determined encoding mode for encoding said following samples.

5. The method according to claim 1, further comprising a step of evaluating an encoding cost associated with each encoding of said sample to be encoded according to the determined encoding mode and according to said at least one other simulated encoding mode.

6. The method according to claim 5, wherein the determination of an encoding mode of at least one following sample to be encoded is a function of the evaluated encoding costs associated with the encoding of at least one sample preceding said at least one following sample to be encoded.

7. The method according to claim 1, further comprising a step of associating with said sample an item of information representing the encoding mode used for encoding said sample.

8. The method according to claim 1, wherein the plurality of encoding modes comprises a Rice-Golomb encoding.

9. The method according to claim 1, wherein the plurality of encoding modes comprises a binary encoding.

10. The method according to claim 1, wherein the default encoding mode is a Rice-Golomb encoding.

11. A method of encoding a digital image signal comprising a plurality of samples, wherein the method comprises the following encoding steps applied to samples taken in a predetermined order for the purpose of them being stored in a buffer memory:
    encoding the samples using a predetermined variable length encoding mode so long as the level of occupancy of the buffer memory is less than a predetermined threshold; and
    encoding the following samples using a predetermined fixed length encoding mode,
    wherein the predetermined threshold is less than or equal to the size of the buffer memory reduced by the maximum length of a code obtained using the predetermined variable length encoding mode.

12. The method according to claim 11, wherein the predetermined variable length encoding mode corresponds to Rice-Golomb encoding.

13. The method according to claim 11, wherein the predetermined fixed length encoding mode corresponds to binary encoding.

14. A device for encoding a digital image signal comprising a plurality of samples, wherein the device comprises the following means applied during the encoding of each sample with a view to its storage in a buffer:
    means for determining the level of occupancy of the buffer;
    means for comparing the level of occupancy with a predetermined threshold;
    means for determining an encoding mode from amongst a plurality of encoding modes when the level of occupancy is above the predetermined threshold, and means for encoding the sample according to the determined encoding mode;
    means for encoding said sample according to a default encoding mode when the level of occupancy is below the predetermined threshold; and
    means for simulating the encoding of said sample to be encoded according to at least one encoding mode different from the determined encoding mode when the level of occupancy is above the predetermined threshold.

15. A device for encoding a digital image signal comprising a plurality of samples, wherein the device comprises the following encoding means applied to samples taken in a predetermined order for the purpose of them being stored in a buffer memory;
    encoding means which are adapted to encode samples using a predetermined variable length encoding mode so long as the level of occupancy of the buffer memory is less than a predetermined threshold; and
    encoding means which are adapted to encode the following samples using a predetermined fixed length encoding mode,
    wherein the predetermined threshold is less than or equal to the size of the buffer memory reduced by the maximum length of a code obtained using the predetermined variable length encoding mode.

16. A non-transitory computer-readable medium storing a computer program containing instructions, which when executed by a computer system causes the computer system to encode a digital image signal comprising a plurality of samples by:
    determining the level of occupancy of a buffer;
    comparing the level of occupancy with a predetermined threshold;
    determining an encoding mode from amongst a plurality of encoding modes when the level of occupancy is above the predetermined threshold, and encoding the sample according to the determined encoding mode;
    encoding said sample according to a default encoding mode when the level of occupancy is below the predetermined threshold; and
    simulating the encoding of said sample to be encoded according to at least one encoding mode different from the determined encoding mode when the level of occupancy is above the predetermined threshold.

17. A non-transitory computer-readable medium storing a computer program containing instructions, which when executed by a computer system causes the computer system to encode a digital signal comprising a plurality of samples by:
  encoding the samples using a predetermined variable length encoding mode so long as the level of occupancy of the buffer memory is less than a predetermined threshold; and
  encoding the following samples using a predetermined fixed length encoding mode,
  wherein the predetermined threshold is less than or equal to the size of the buffer memory reduced by length of a code obtained using the predetermined variable length encoding mode.

* * * * *